Sept. 24, 1940.          R. C. DEMLER                2,215,545
           METHOD AND MACHINE FOR WRAPPING PACKAGES
               Filed May 14, 1938        16 Sheets-Sheet 1
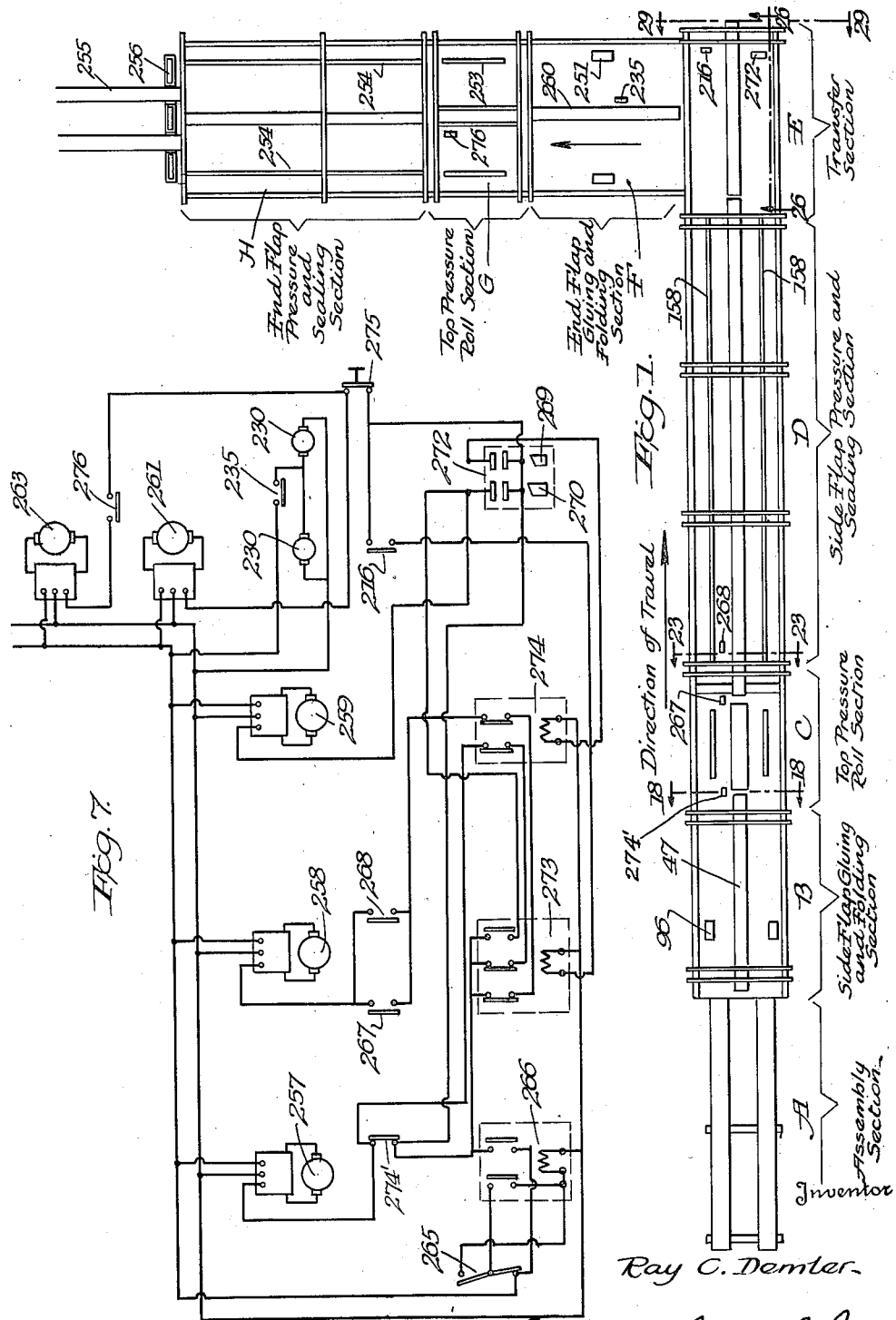
Inventor
Ray C. Demler
By Cushman Hardy & Cushman
Attorneys

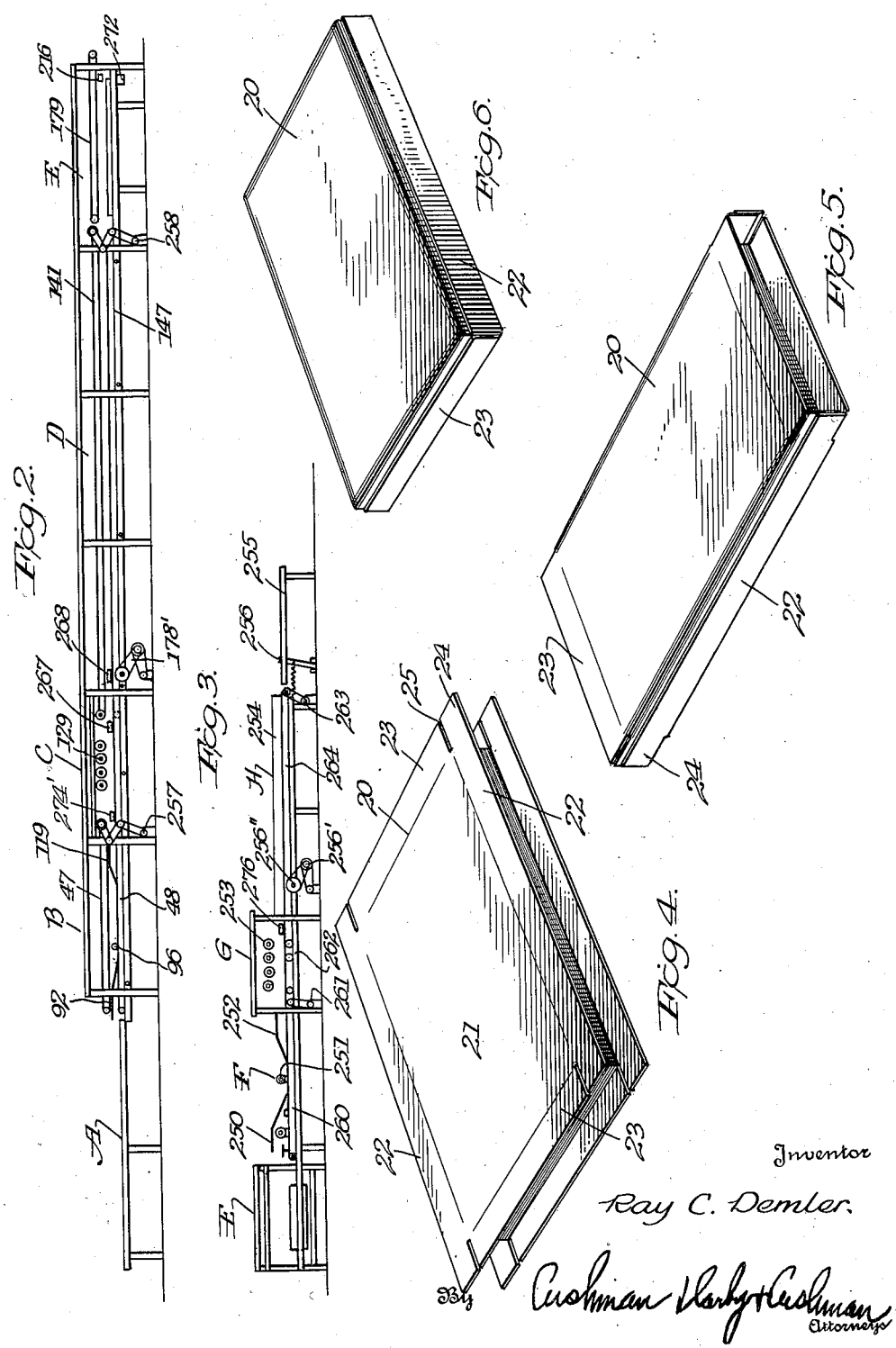

Sept. 24, 1940.  R. C. DEMLER  2,215,545
METHOD AND MACHINE FOR WRAPPING PACKAGES
Filed May 14, 1938   16 Sheets-Sheet 3
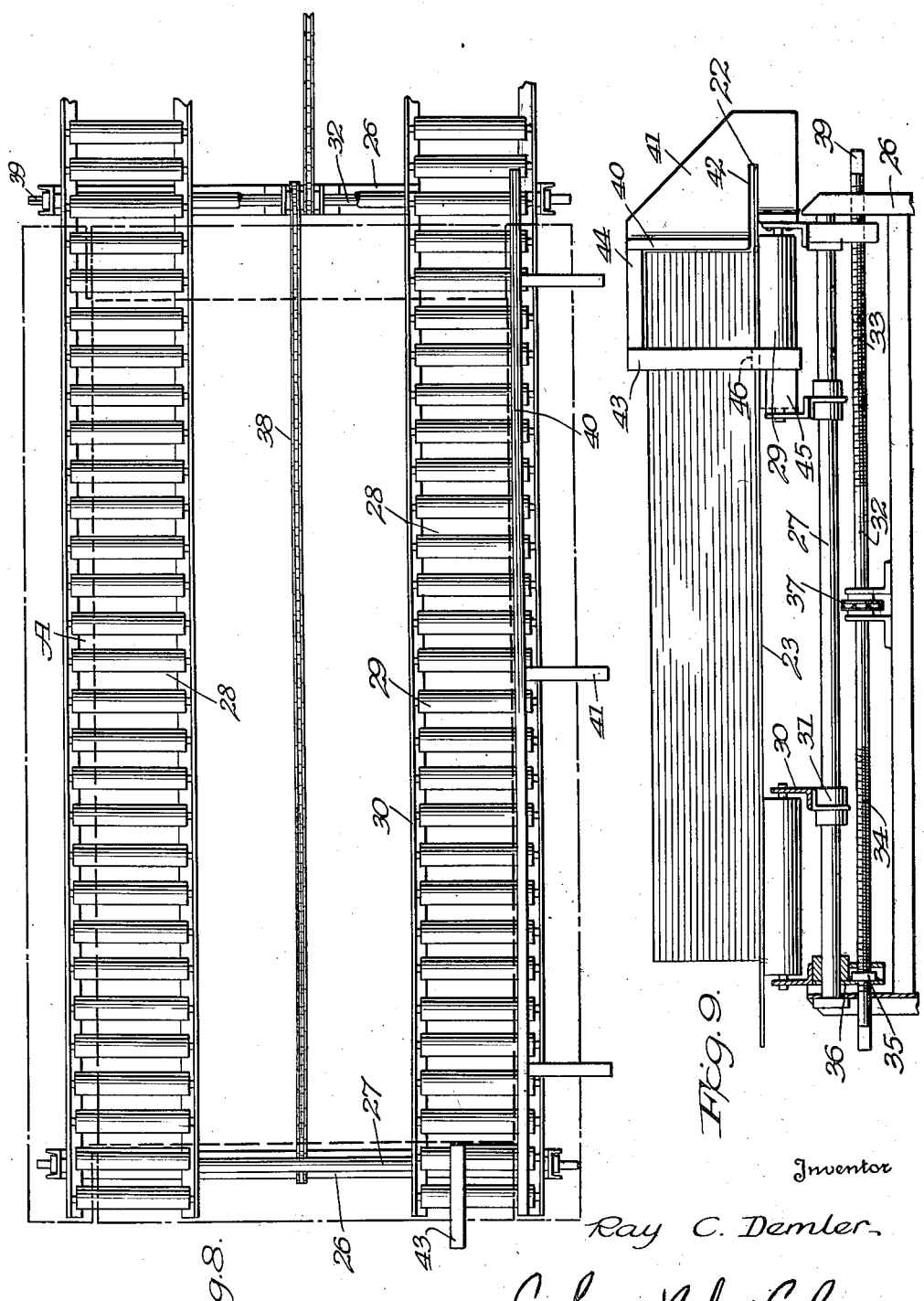
Inventor
Ray C. Demler
By Cushman Darby & Cushman
Attorneys

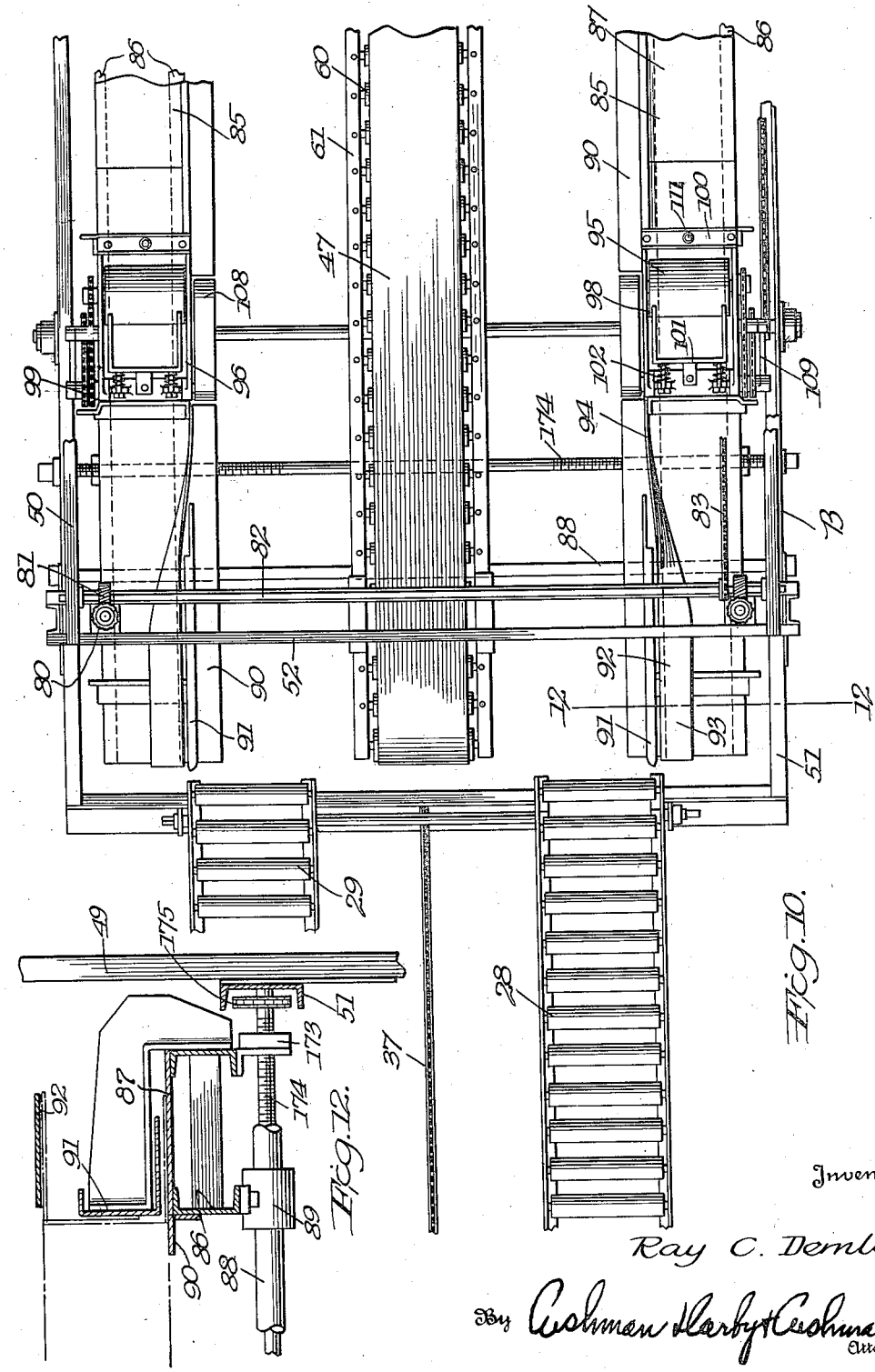

Sept. 24, 1940.　　　　　R. C. DEMLER　　　　　2,215,545
METHOD AND MACHINE FOR WRAPPING PACKAGES
Filed May 14, 1938　　　　16 Sheets-Sheet 5
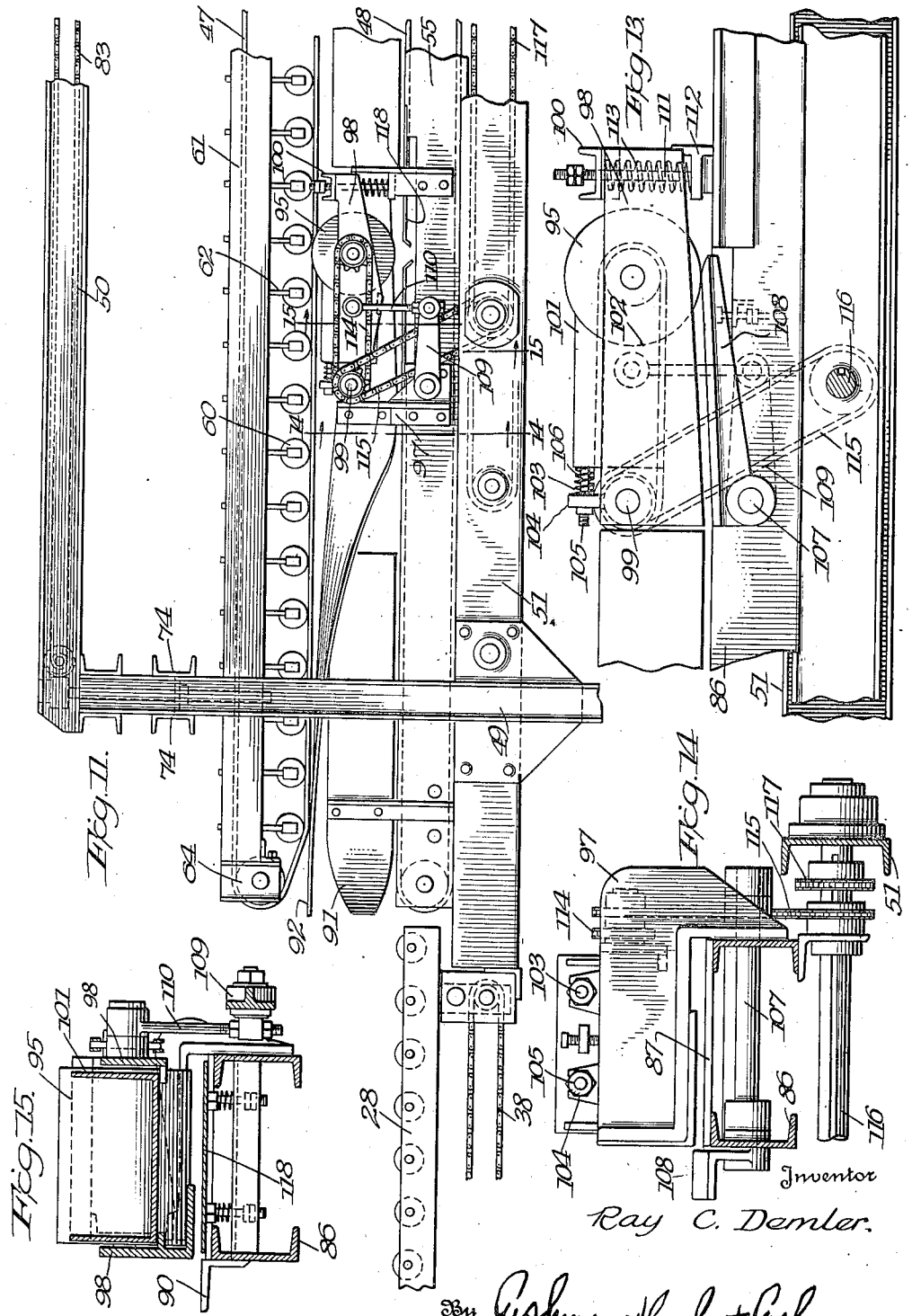

Sept. 24, 1940.   R. C. DEMLER   2,215,545
METHOD AND MACHINE FOR WRAPPING PACKAGES
Filed May 14, 1938   16 Sheets-Sheet 6

Inventor
Ray C. Demler
By Cushman Darby Cushman
Attorneys

Sept. 24, 1940.  R. C. DEMLER  2,215,545
METHOD AND MACHINE FOR WRAPPING PACKAGES
Filed May 14, 1938  16 Sheets-Sheet 7
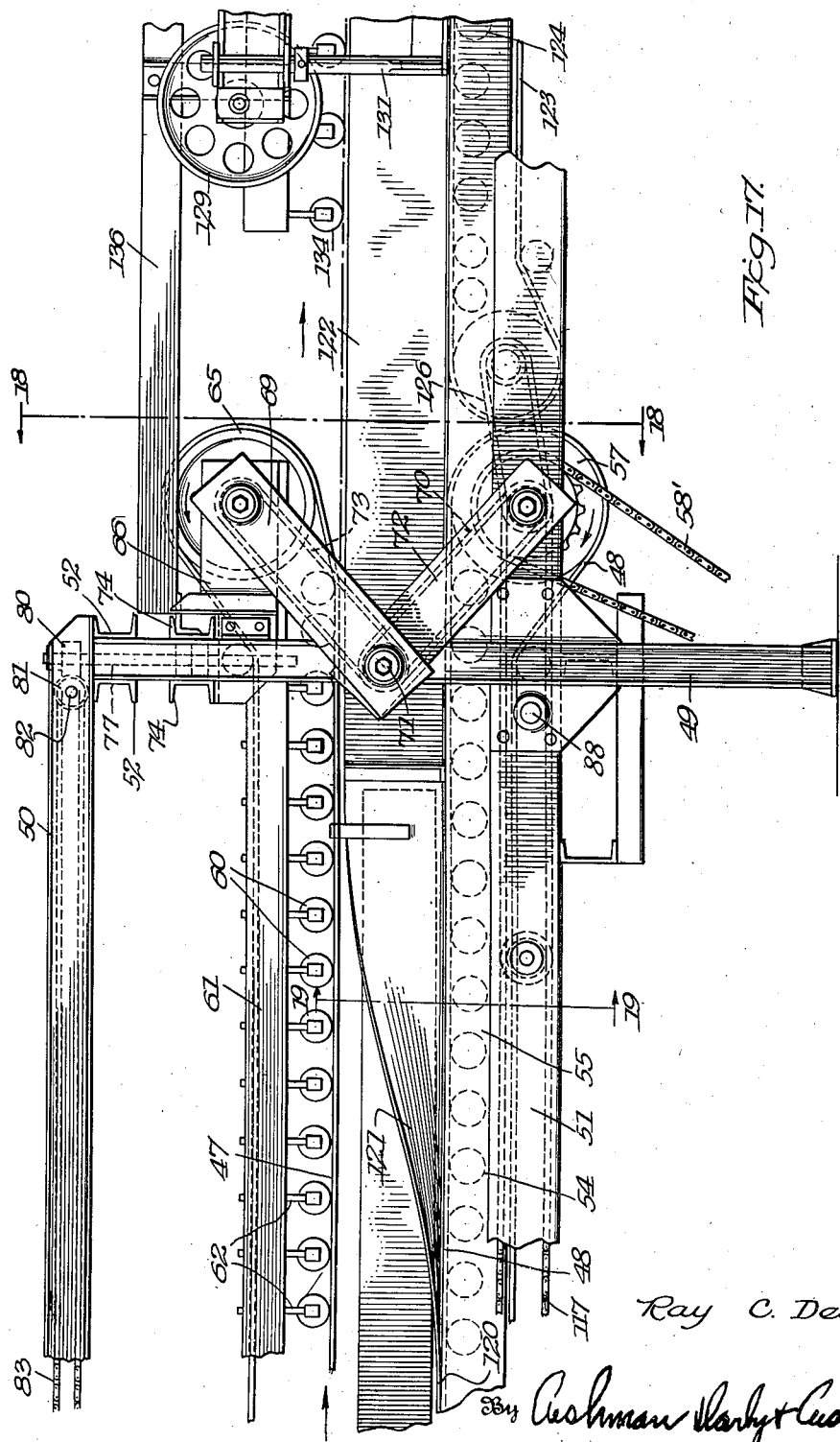
Fig. IV.
Inventor
Ray C. Demler.
By Cushman Darby + Cushman
Attorneys

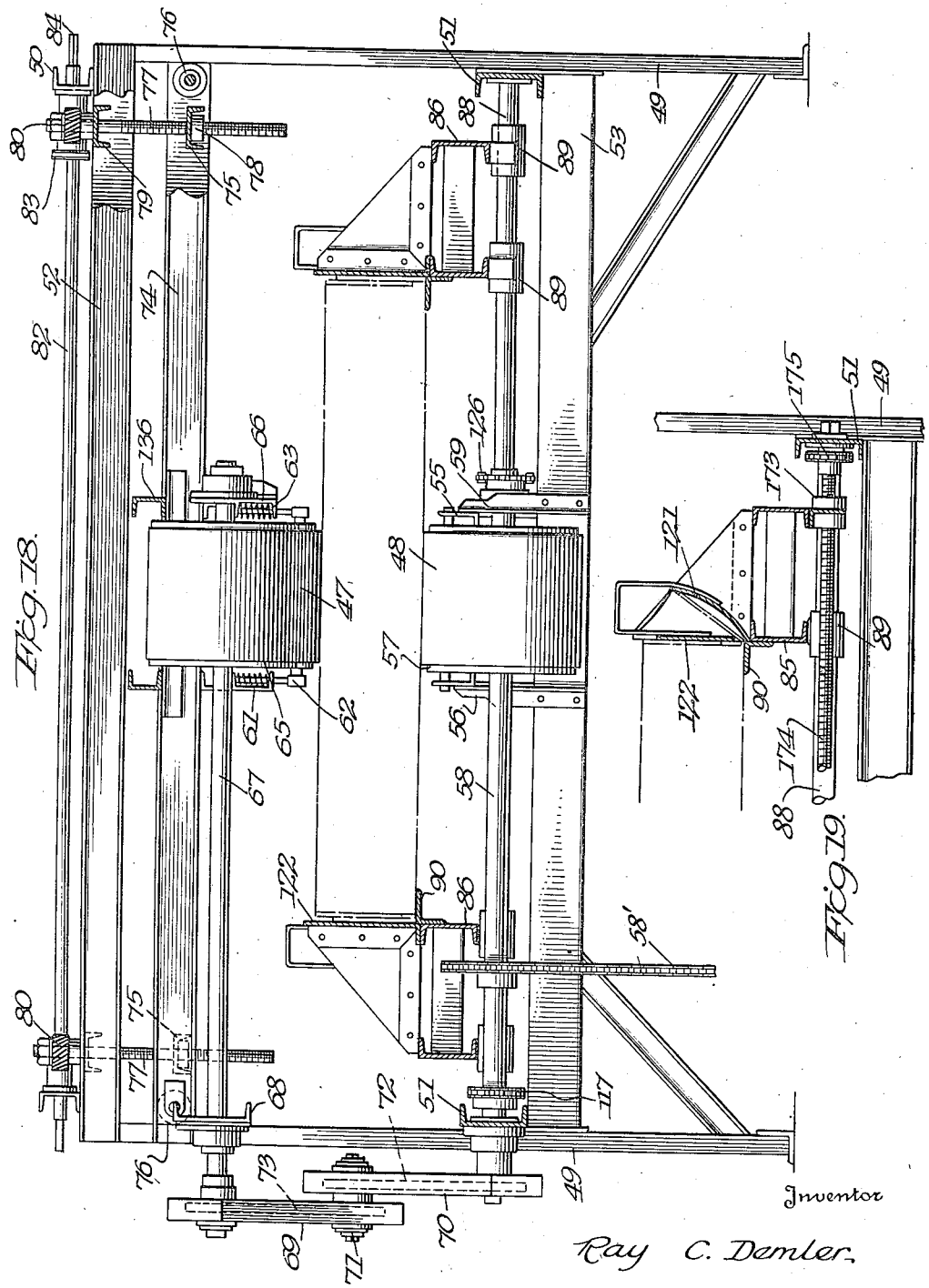

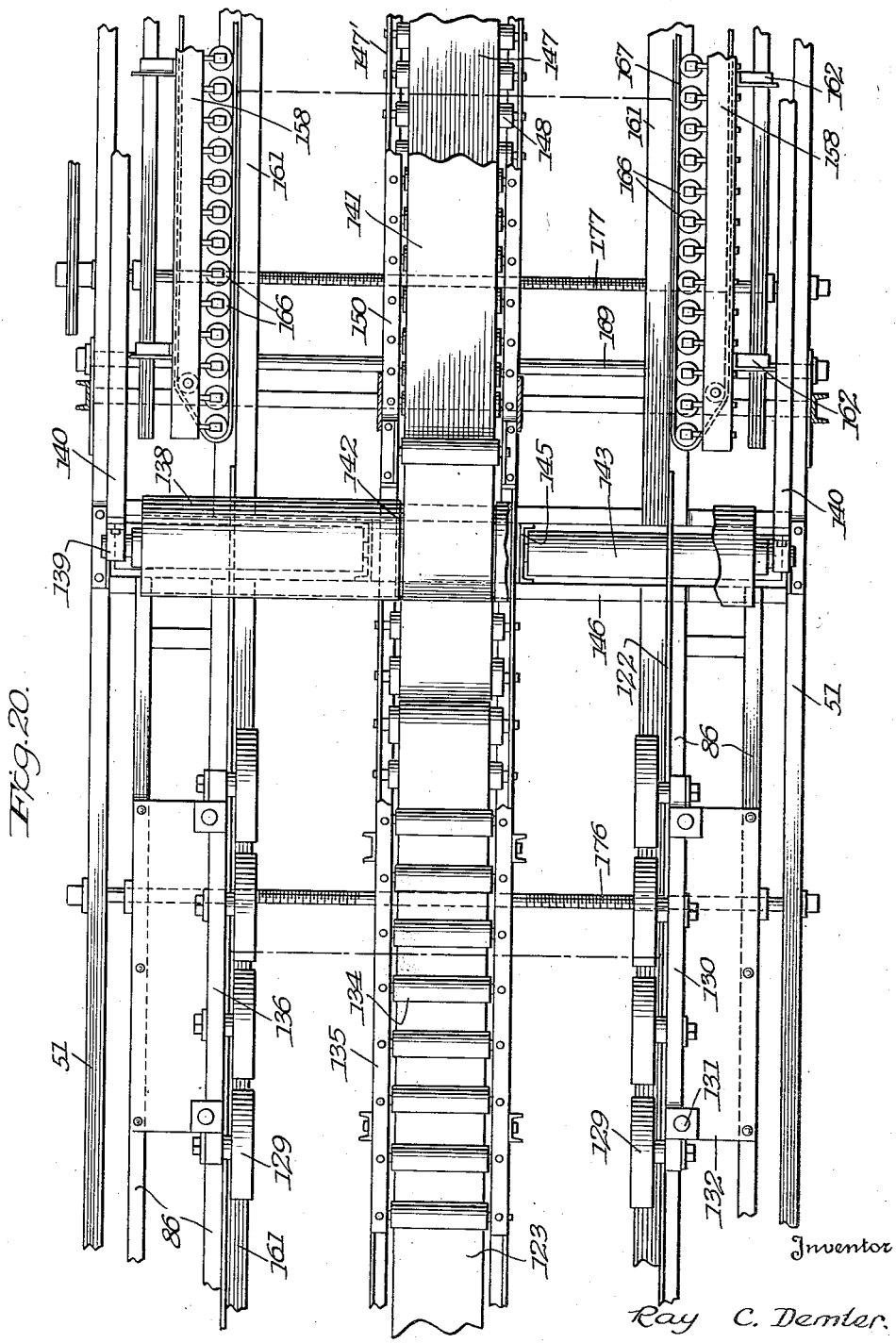

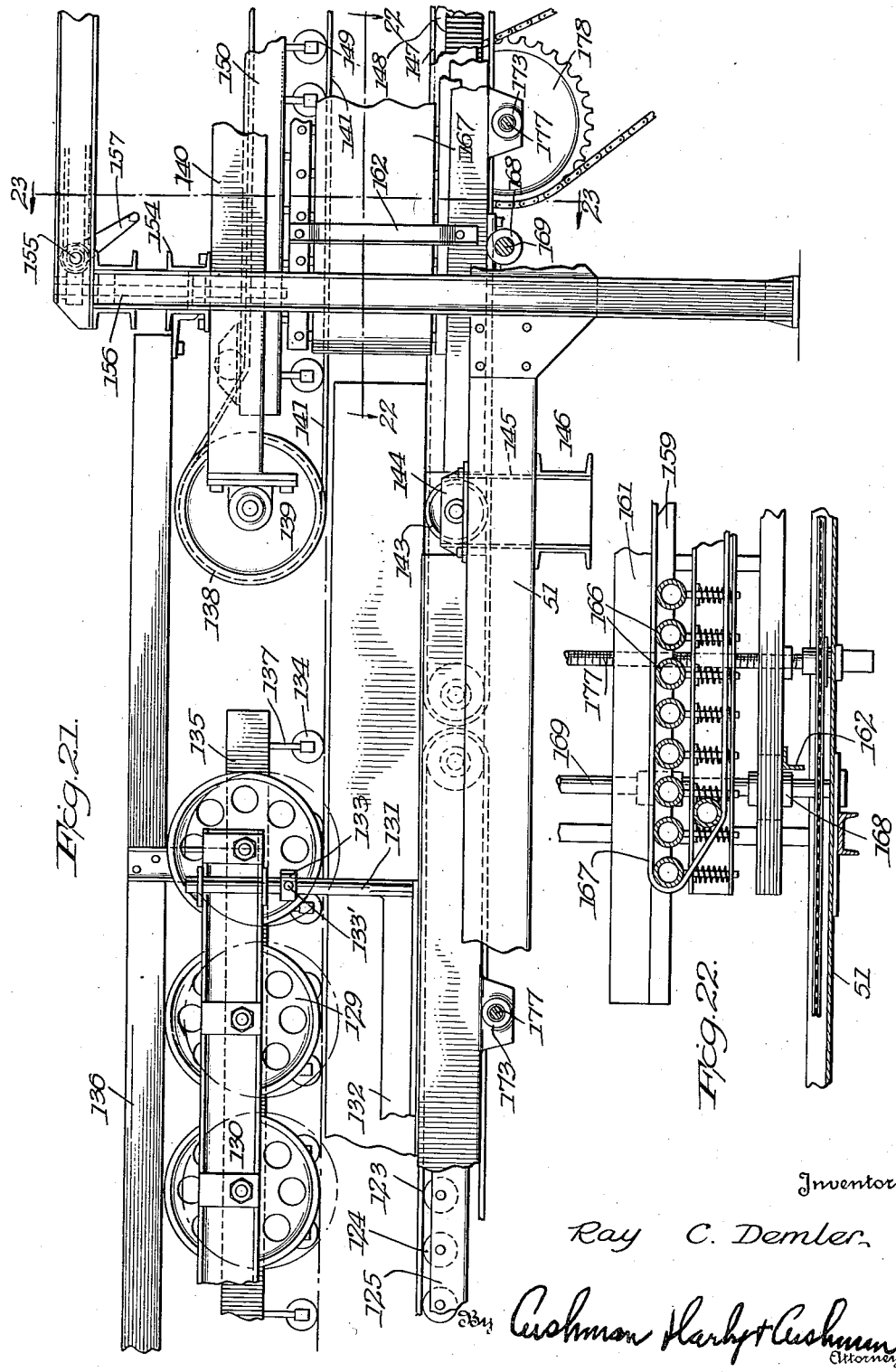

Sept. 24, 1940. R. C. DEMLER 2,215,545
METHOD AND MACHINE FOR WRAPPING PACKAGES
Filed May 14, 1938 16 Sheets-Sheet 11
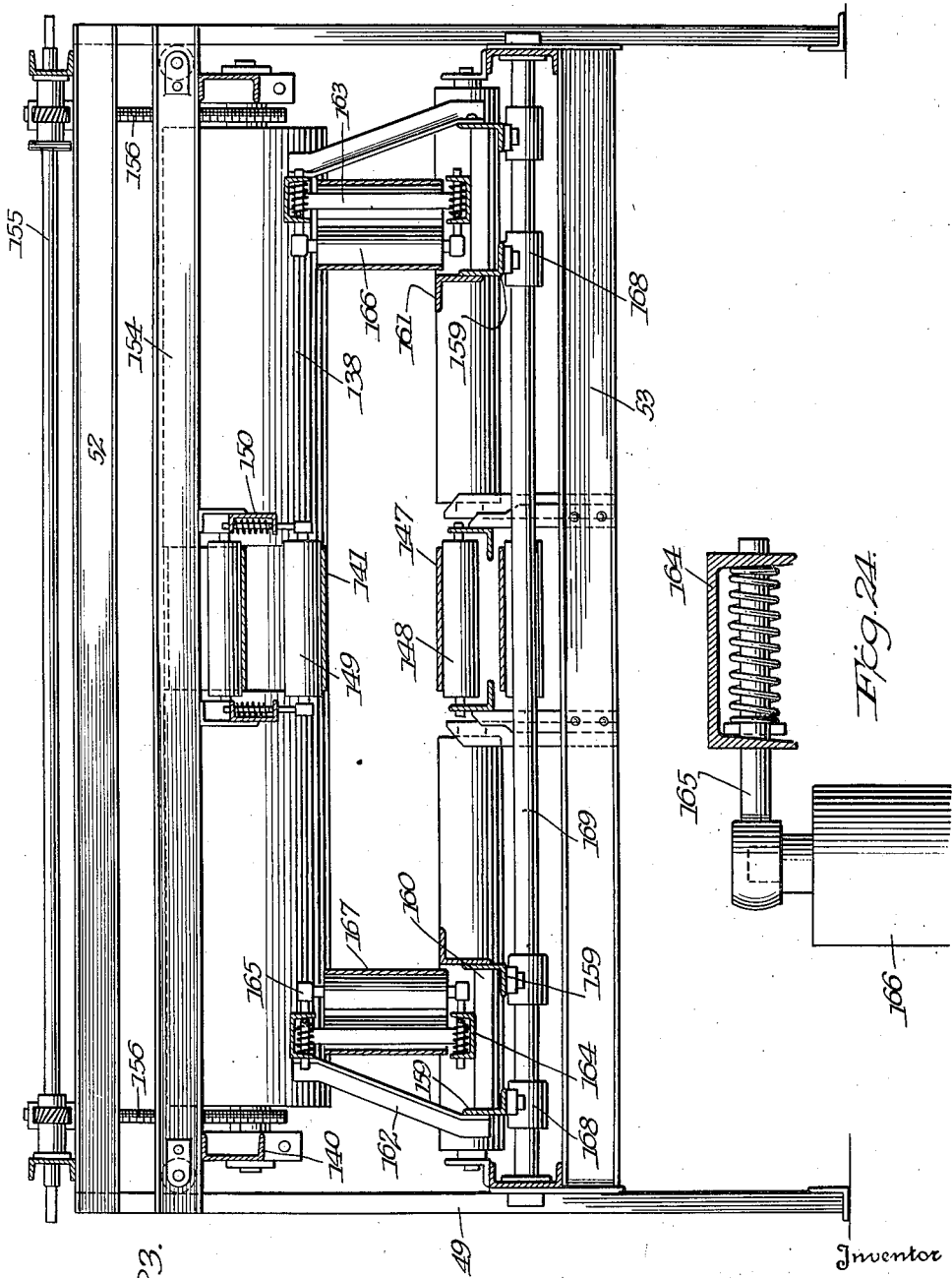

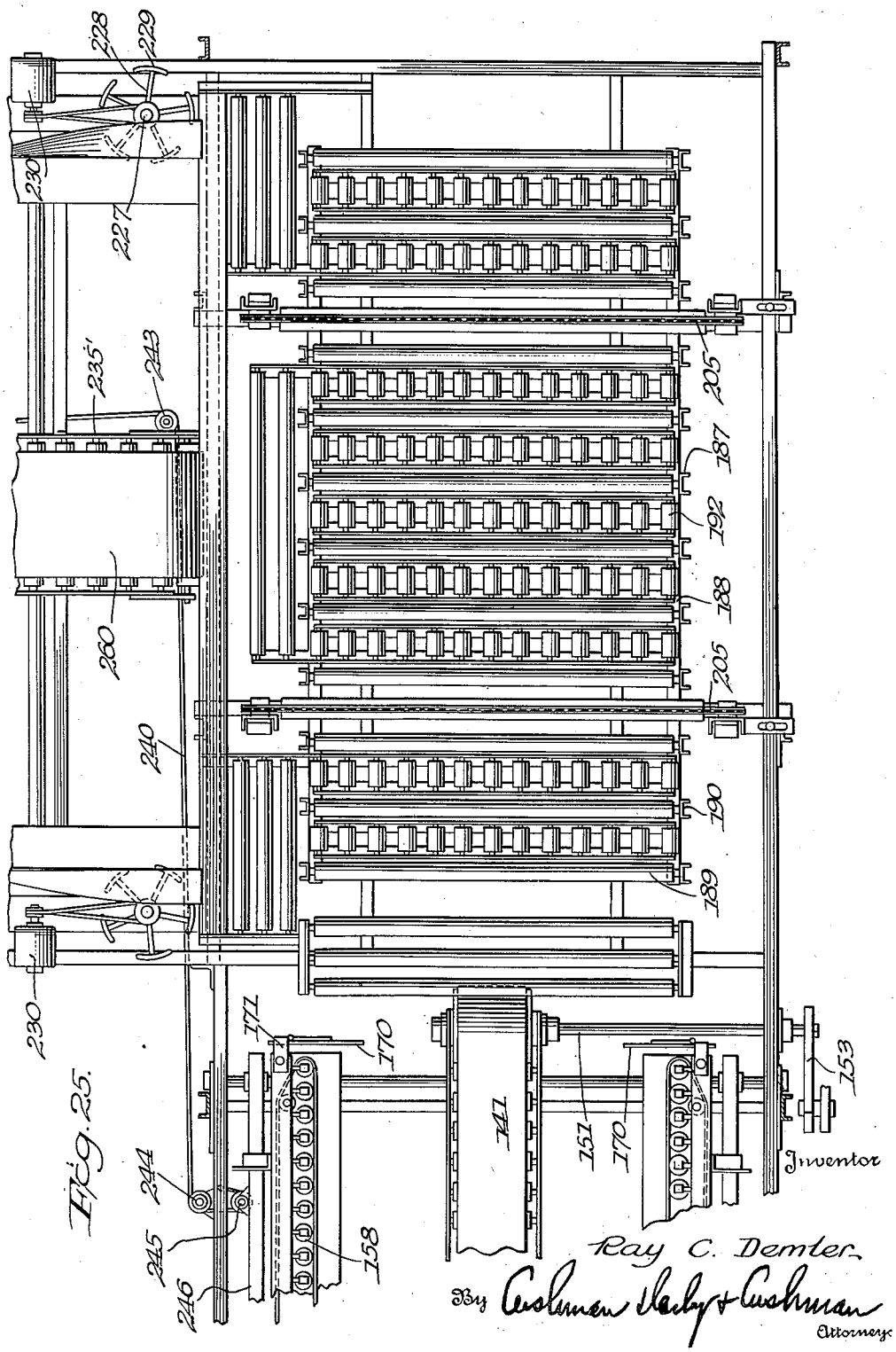

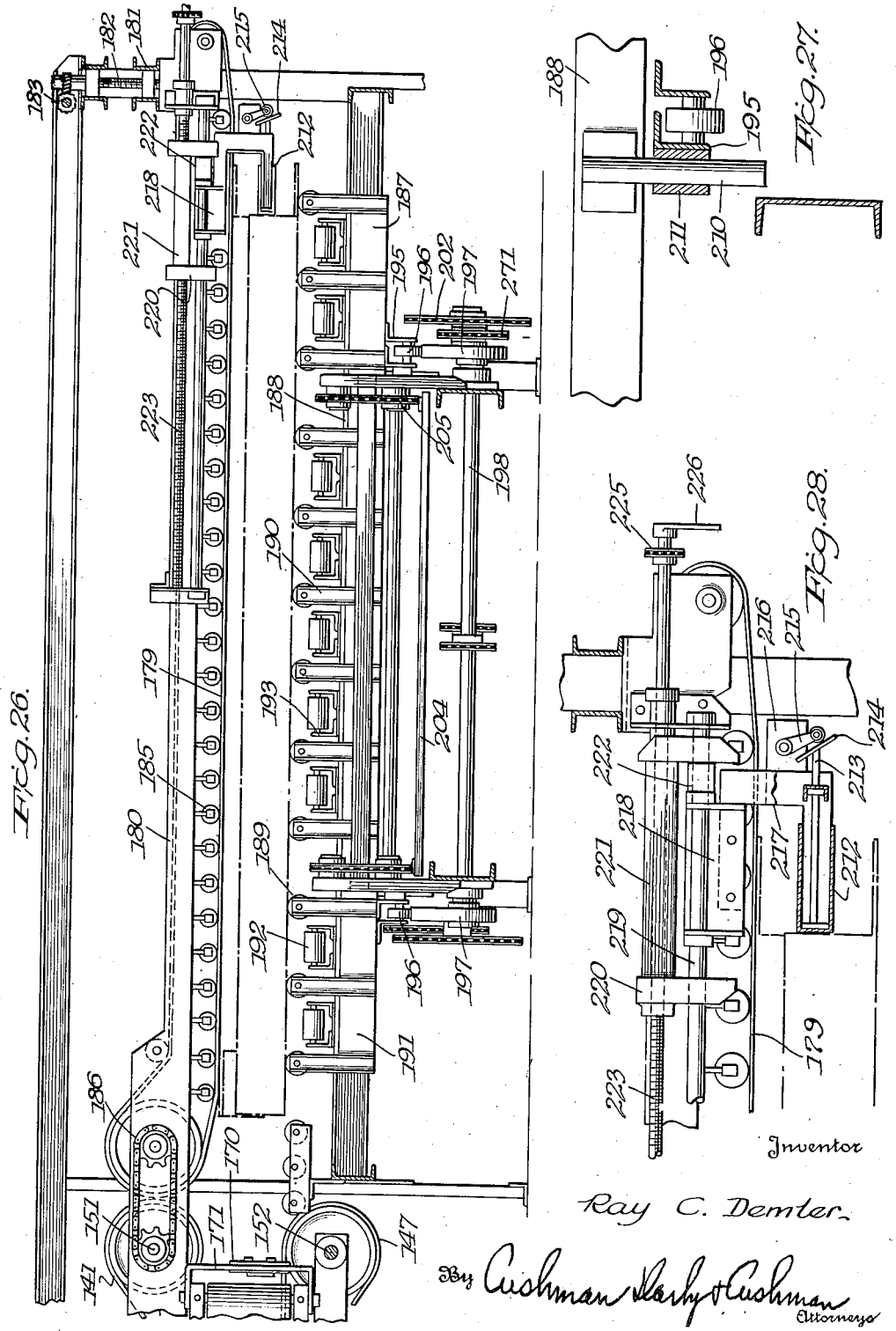

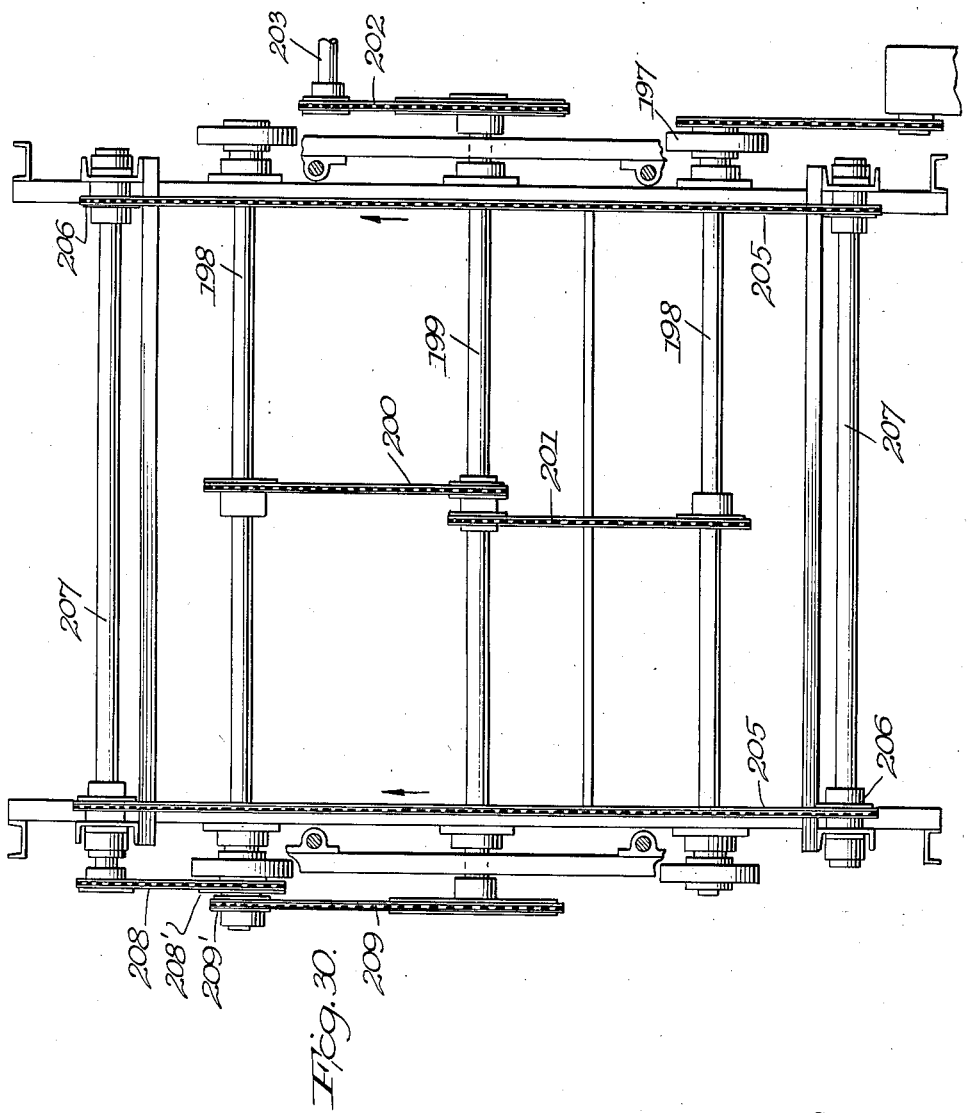

Sept. 24, 1940.　　　　　R. C. DEMLER　　　　　2,215,545
METHOD AND MACHINE FOR WRAPPING PACKAGES
Filed May 14, 1938　　　16 Sheets-Sheet 16
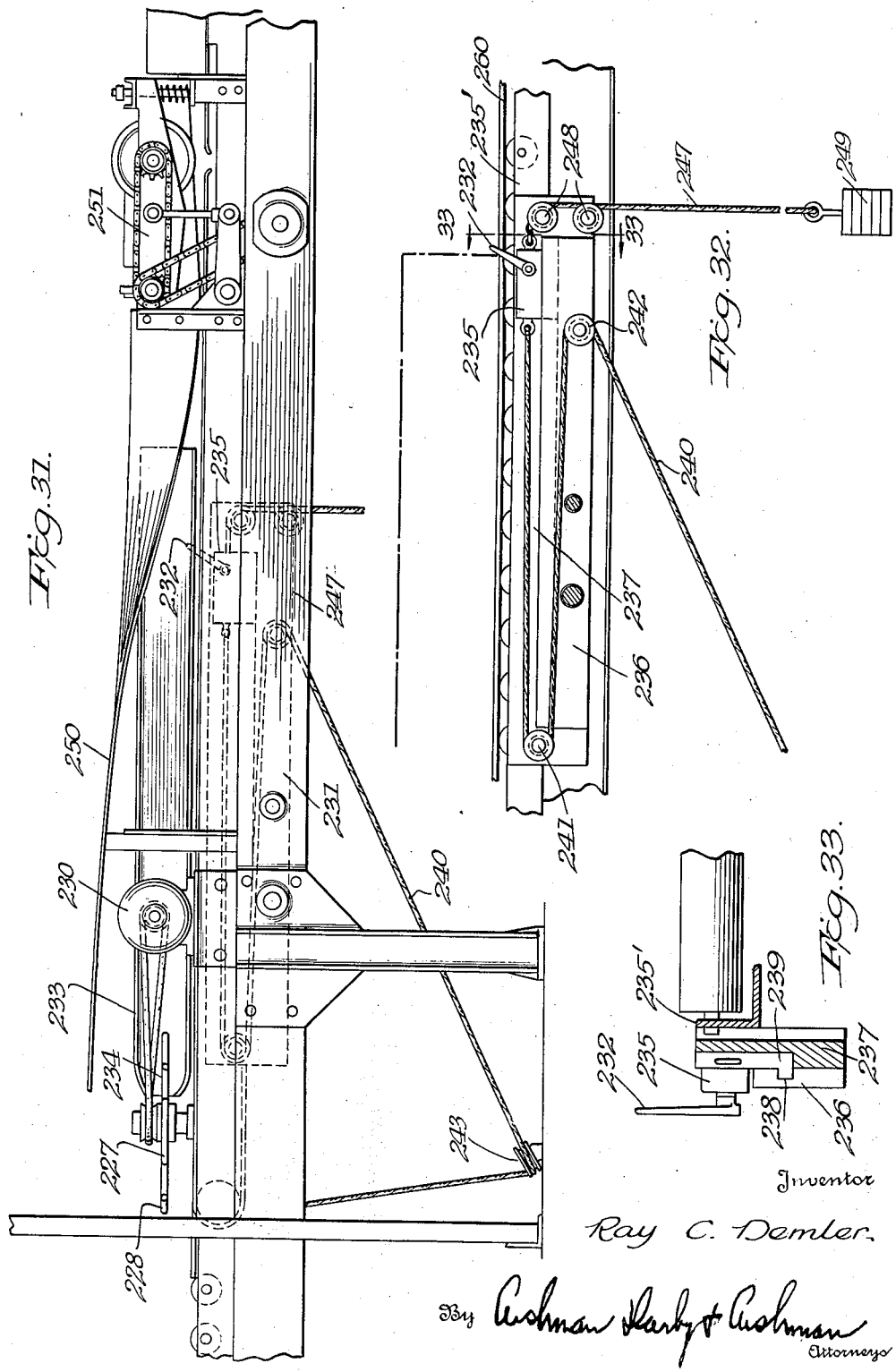

Patented Sept. 24, 1940

2,215,545

UNITED STATES PATENT OFFICE 2,215,545

METHOD AND MACHINE FOR WRAPPING PACKAGES

Ray C. Demler, Tacoma, Wash., assignor to Pacific Forest Industries, Tacoma, Wash., a corporation of Washington Application May 14, 1938, Serial No. 208,027

53 Claims. (Cl. 93—3)

The present invention relates to a method and machine for wrapping or packaging various articles, and is particularly useful in wrapping plywood panels or the like.

The primary object of the invention is the provision of a method and machine for wrapping or packaging plywood panels or sheets in sectional cartons, wherein each carton section is provided with side, end and corner flaps. The method contemplates assembling a stack of panels between a pair of flat carton sections and then feeding the assembled stack, first in one direction while one set of flaps are folded, glued and pressed, and then feeding the partially wrapped package in a direction substantially transverse to its initial direction of travel, while the corner and other set of flaps are folded, glued and pressed to form the completely wrapped package.

A further object is the provision of a machine in which the carton sections and panels may be assembled, and the assembled stack then fed automatically through the machine while the several sets of flaps are systematically folded, glued and pressed to provide the completely wrapped package ready for immediate shipment.

Another object provides an assembly table upon which the carton sections and panels may be initially assembled, with the panels being so positioned with respect to the carton flaps that the assembled stack may be fed to the other units of the machine without any further attention of the operators.

An additional object is the provision of means for applying pressure to the partially wrapped packages before the glue has set, to compress the package and flatten out and expel any air pockets from between the various sheets or panels of plywood.

A still further object is the provision of a package actuated transfer mechanism which will receive a partially wrapped package from one conveyor unit and automatically transfer it to a second conveyor unit extending in a direction substantially transverse to the first unit.

Another object is to provide means for controlling the feed of the packages through the machine to prevent crowding of and injury to the packages. Means are also associated with the transfer mechanism for rendering certain of the conveyor units inoperative when a package is in the transfer mechanism, whereby crowding of the transfer mechanism is prevented.

Another object is the provision of means for adjusting the conveyor units to accommodate packages of various sizes. Furthermore, means are provided to adjust the package operated control means of the transfer mechanism to accommodate packages of different lengths.

A further object is the provision of a method and machine for effectively and securely wrapping stack plywood panels without injuring the panels during the wrapping operation.

With the foregoing and other objects in view, the invention will now be more fully described, reference being had to the accompanying drawings, wherein:

Figure 1 is a diagrammatic plan view of the complete wrapping machine;

Figure 2 is a side elevation of the machine shown in Figure 1;

Figure 3 is an end elevation of the machine shown in Figure 1;

Figure 4 is a perspective view of a stack of sheets assembled between a pair of carton sections ready for the wrapping operation;

Figure 5 is a perspective view of a partially wrapped package;

Figure 6 is a perspective view of a completely wrapped package;

Figure 7 is a detail of the several switches, motors and the circuits connecting the same;

Figure 8 is a top plan view of the assembly table;

Figure 9 is an end elevation of the assembly table;

Figure 10 is a top plan view of a portion of the side flap folding and gluing section;

Figure 11 is a side elevation thereof;

Figure 12 is a section taken on line 12—12 of Figure 10;

Figure 13 is an enlarged elevation of the glue applicator as viewed from the inside of the machine;

Figure 14 is a section taken on line 14—14 of Figure 11;

Figure 15 is a section taken on line 15—15 of Figure 11;

Figure 17 is a side elevation thereof;

Figure 18 is a section taken on line 18—18 of Figure 17;

Figure 19 is a section taken on line 19—19 of Figure 17;

Figure 20 is a top plan view of the top pressure roll section and the front portion of the side flap sealing section;

Figure 21 is a side elevation thereof;

Figure 22 is a section taken on line 22—22 of Figure 21;

Figure 23 is a section taken on line 23—23 of Figure 21;

Figure 24 is an enlarged detail of the mounting for one of the side flap sealing rollers;

Figure 25 is a top plan view of the transfer table and the corner flap tucking mechanism;

Figure 26 is a side elevation of the transfer mechanism;

Figure 27 is an enlarged detail of a part of the transfer table;

Figure 28 is an enlarged detail of the package actuated control means for the transfer mechanism;

Figure 30 is a top plan view of the drive mechanism for the transfer table;

Figure 31 is a side elevation of the corner flap tucking mechanism and the front portion of the end flap folding and gluing section;

Figure 32 is an enlarged detail of the switch for controlling the corner flap tucking mechanism; and Figure 33 is a section taken on line 33—33 of Figure 32.

*General description of method and machine*

Figure 16:
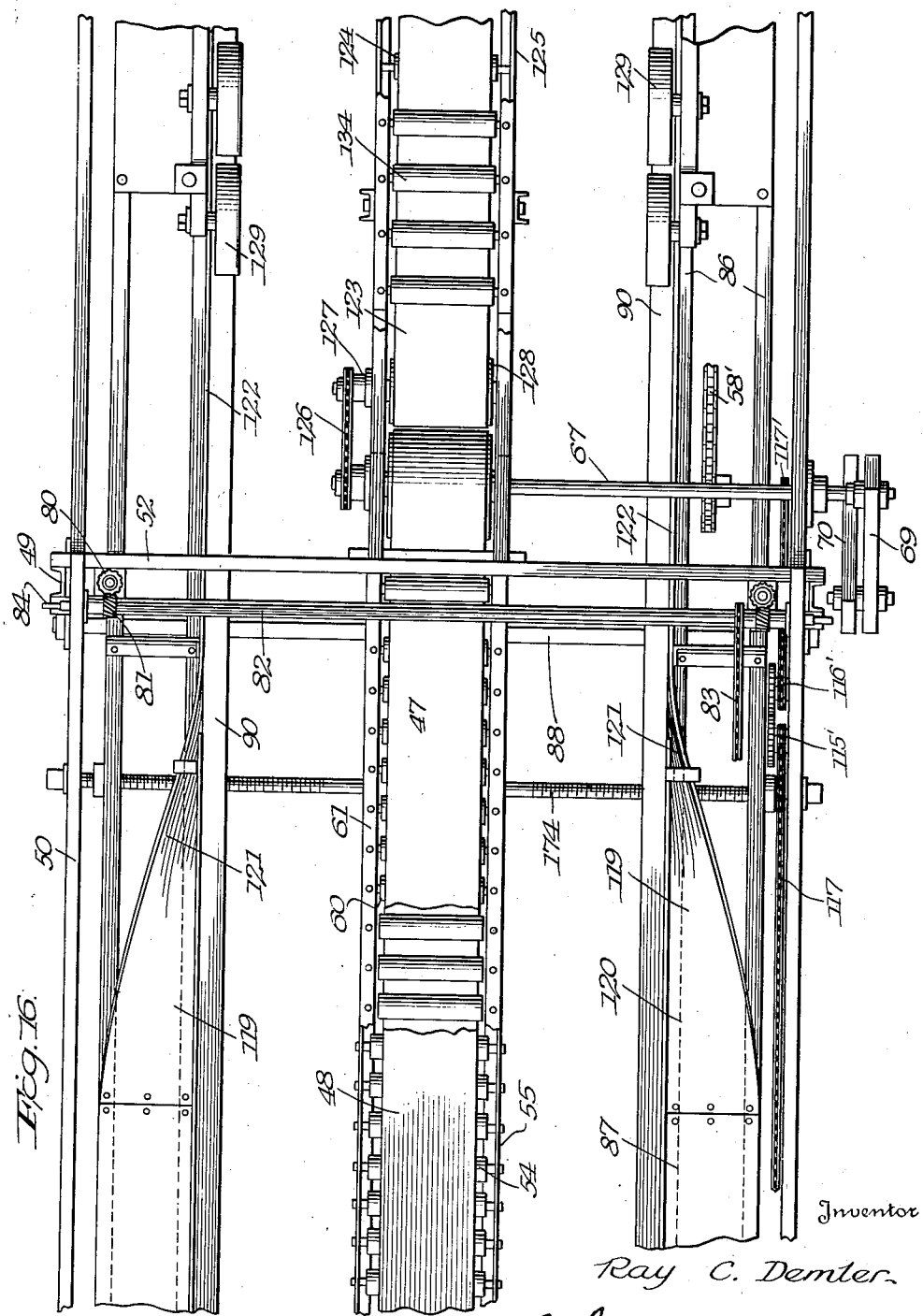
Figure 16 is a top plan view of one end portion of the side flap gluing and folding section and the front portion of the top pressure roll section.

Referring to Figures 1 to 6, there are disclosed diagrammatic views of the wrapping machine and the package as it appears at various stages of its progress through the machine. While the machine may be used for wrapping numerous materials, it is primarily designed for wrapping plywood sheets or panels in sectional cartons. Furthermore, while various forms of sectional cartons may be employed, the one illustrated in Figure 4 is the preferred type. In this embodiment, each carton section comprises a flat sheet-like element 20 of relatively heavy paper board or other similar material. This section consists of a body portion 21, opposed side flaps 22, opposed end flaps 23, and corner flaps 24 secured to and forming continuations of the side flaps 22. The corner flaps are separated from the end flaps by slots 25 which are of sufficient width to permit the several flaps to be readily folded during their progress through the machine without interference from the other flaps.

The machine (see Figures 1 and 2) is provided with an assembly section or table A where a plurality or stack of panels are assembled between a pair of carton sections. In assembling each stack prior to its travel through the machine, a carton section 20 is first placed upon the assembly table A with its flaps in relatively uncreased or unfolded condition and extending in substantially the same plane as the body of the section. A stack of plywood panels are then placed upon the section within the area covered by the body portion 21, and a second carton section is then placed on top of the stack in the same relation as the lower section, that is, with the several flaps projecting beyond the confines of the stack (see Figure 4). It is to be understood that the machine is capable of receiving panels of various lengths, widths and thicknesses and that carton sections of various sizes may be provided to accommodate the type of panel to be wrapped.

After the carton sections and stack of panels have been assembled as indicated, the assembled stack is then moved forward into position to be received within a side flap gluing and folding section B joining the assembly table A. This section is preferably provided with upper and lower conveyor belts (to be later described in detail) which receive and feed the assembled stack while the side flaps 22 of the upper carton section are being folded down against the stack. The side flaps of the lower carton section are then passed under glue applicators which apply glue to the inner or upper surfaces of these flaps while in their unfolded condition. As the assembled stack is fed further through the section B, the lower glued side flaps are then folded upwardly against the folded side flaps of the top carton section and the folded flaps are thereafter maintained in contacting relation.

The partially wrapped package is then fed into a top pressure roll section C which applies pressure upon the top carton section before the glue has set. This is for the purpose of pressing or squeezing out any air pockets formed in the plywood panels and to compress the carton sections together. Thereafter, the package is fed into a relatively long side flap sealing section D provided with means for applying pressure to the folded and glued side flaps until the glue has set, thereby completely sealing the side flaps of both carton sections. As the partially wrapped package is fed to the end of section D, it will have assumed the appearance of the package shown in Figure 5 of the drawings. That is, the side flaps will have been folded, glued and sealed, but the end and corner flaps will still be in unfolded condition.

The package is then moved onto a transfer section E which is provided with package operated means for first stopping the forward progress of the package and then moving the package laterally or in a direction transverse to its path of movement through the sections B, C and D. As the partially wrapped package passes from the transfer section E, it is received by and fed through an end flap gluing and folding section F. However, during its movement from the section E to the section F, means are provided for tucking or folding in both sets of corner flaps 24. The end flaps 23 of the top carton section are then folded down upon the folded corner flaps and are retained in this position while the upper or inner surfaces of the end flaps 24 of the lower carton section are coated with glue or adhesive. Thereafter, these flaps are folded up against the folded end flaps of the upper carton section, in a manner similar to that described in connection with the folding and gluing of the side flaps. In like manner, the package is fed through a top pressure roll section G which again applies pressure to the top carton section to assure that the sections are tightly wrapped about the panels.

The package is finally passed through an end flap sealing section H which applies pressure to the folded end flaps and maintains the flaps in this condition until the glue has had an opportunity to set and thereby completely seal the end flaps. As the package passes out of the section H, the stack of panels will be completely wrapped as shown in Figure 6, and may be stacked or stored ready for shipment. If desired, means may be provided to wax the under surfaces of the packages as they leave the sealing section H. This is for the purpose of preventing the packages from scuffing when one package is moved over another in transit.

It is to be understood that as one assembled stack is fed from the assembly table A into the side flap gluing and folding section B, another stack may be immediately assembled and fed to the section B, and this operation continued as desired. Means are provided, however (which will later be described), for controlling the passage of the partially wrapped packages through the machine to prevent crowding and possible injury to the packages. Furthermore, means are provided whereby when a package is in the transfer mechanism, the feeding means for the sections B, C and D are rendered inoperative until the package has been transferred to the end flap gluing and folding section F.

*Assembly table*

The machine will now be described in detail. With respect to the assembly section or table A, this is clearly illustrated in Figures 8 and 9, wherein the numeral 26 designates spaced connected table supporting cross frames.

Cross rods 27 are rigidly mounted, one in each cross frame, and upon these rods are adjustably carried spaced longitudinally extending panel supporting elements 28. Each element 28 comprises a plurality of spaced idle rolls 29 pivotally mounted in side rails 30 which are preferably L-shaped in cross-section. Projecting downwardly and secured to the horizontal flange of each rail are collars 31 which embrace the rods 27. As shown in Figure 9, the rolls 29 are arranged to directly receive and support a stack of plywood sheets or panels. In order to accommodate panels of different sizes, the elements 28 are slidable on the cross rods 27 and may be adjusted toward or away from each other depending upon the size of the panels to be wrapped.

The means for adjusting the elements 28 comprise a plurality of cross shafts 32 which are preferably mounted directly below the cross rods 27. Each shaft 32 is provided with right and left hand threads 33 and 34 respectively, and these are associated with nuts 35, each of which is welded or otherwise rigidly secured to a bracket 36 projecting downwardly from and secured to the outside collar 31 of each element 28. Aligned openings are formed in each of the brackets 36 and these register with the opening in the nut 35 carried by the brackets. Each set of openings are arranged to receive the threaded portions of the shafts 32, so that upon rotation of the shafts, and by reason of the right and left hand threads, the opposite nuts and brackets 35 and 36 will be moved toward and away from each other, and thus carry with them their respective elements 28. In order that the shafts 32 may be operated in unison, each shaft is provided with a sprocket wheel 37, and these are connected by a sprocket chain 38. Thus, by applying a suitable tool to any one of the squared end portions 39 of the cross shafts 32, the shafts are rotated and thus move the elements 28 toward or away from each other to provide the correct adjustment for the size of panels to be wrapped.

In order that the stack of panels may be correctly positioned relative to the carton sections 20 so that the assembled stack and cartons may be moved forwardly to the side flap gluing and folding section without further rearrangement of the stack and carton sections, there is provided means for locating the panels upon the body portion 21 of the lower carton section and within the confines of the side and end flaps 22 and 23. This means comprises a side board 40 carried by and extending longitudinally of one of the elements 28. This board is directly connected to a plurality of side plates 41, the lower portions of which are secured to the upright flange of the outer rail of one of the elements 28. Each plate 41 is provided with an inwardly opening side flap receiving slot 42, the lower wall of which is in substantially the same plane as the top surface of the rolls 29. Thus, when a carton section is initially placed upon the assembly table and is pushed against the side board 40, one side flap 22 will enter the slot 42, as clearly shown in Figure 9. The slots are of a length which will place the inner end of the flap 22 directly in line with the side boards whereby a stack of panels may be shoved against the side board and correctly positioned on the carton section 20.

In addition to employing the side board 40 and plates 41, it is necessary that means be provided to correctly position one of the end flaps 23 of the carton section as it is placed on the assembly table. This means comprises an end plate 43 supported at its top by a cross bar 44 projecting from the side board 40. The end plate is secured at its base by a block 45 carried by one of the side rails 30. Similarly to the side plates 41, the end plate 43 is provided with an inwardly extending slot 46 located in the plane of the slots 42 and adapted to receive an end flap 23 of a carton section when the latter is initially positioned on the assembly table. Thus, by reason of the side board 40, the side and end plates 41 and 43 respectively, a carton section may be easily and quickly placed in position to correctly receive a stack of panels. That is, the stack will be positioned within the confines of all of the flaps, so that the subsequent flap folding and gluing operation may be executed without any rearrangement of the stack with respect to the carton sections.

Referring to Figure 10, it will be observed that the extreme forward end of the assembly table is connected to and supported by the package receiving end of the side flap gluing and folding seition B. Preferably, the assembly table is of sufficient length to permit a stack of panels and carton sections to be assembled at one end while an assembled stack is supported at the other end in position to be received by the section B. In assembling the stack, an operator places a carton section on the table and against the side board and end plates as above described. This operator then, with the assistance of a second operator, places a stack of plywood sheets or panels on top of the carton section. One of the operators then moves the partially assembled stack forwardly on the table to a point clear of the side board 40 where another carton section is placed on the top of the stack so that all of the flaps are positioned exteriorly thereof. That is, the top carton section is positioned on top of the stack in the same relation as the lower carton section. In this manner, the assembled stack is moved over the rolls 29 to the end of the assembly table and introduced into the section B.

*Side flap gluing and folding section*

The mechanism for folding and gluing the side flaps of the carton sections includes upper and lower positively driven belts 47 and 48 respectively (see Figures 10 to 19). These belts are adapted to receive each assembled stack from the assembly section A and feed it at the proper rate of speed while the side flaps of both carton sections are being folded and glued. All of this mechanism is mounted in an open frame structure preferably made up of rails of channel formation. These rails comprise uprights 49 which support and are connected to upper and lower longitudinal rails 50 and 51 respectively. Upper and lower cross rails 52 and 53 complete the main body of the open frame and adequately support the different units of the feeding, folding and gluing mechanism.

The lower belt 48 is of the endless type and is supported by and surrounds a plurality of idle rollers 54. These rollers are pivotally mounted between spaced longitudinally extending rails 55 supported centrally of the cross rails 53 by brackets 56 which are carried by the cross rails 53 and directly support the side rails 55 and rollers 54. One end of the endless belt 48 passes around a drive pulley 57 which is fixed upon a cross shaft 58 driven from any suitable source of power by means of the sprocket gearing 58'. The shaft 58 is journaled at its outer extremity in the longitudinal side rail 51, while the inner end of the shaft is journaled in an upstanding bracket 59 connected to the cross rail 53 (see Figures 18).

The upper belt 47 is also of the endless type and, similarly to the the lower belt, is supported by and surrounds a plurality of idle rollers 60. The rollers 54 are rigidly mounted in the rails 55 whereas the rollers 60 are mounted in the spaced channel bars 61 by means of hangers 62 which are normally spring-pressed downwardly into engagement with the lower run of the belt by the coil springs 63. The belt 47 passes around an end guide roller 64 mounted in one end of the belt supporting unit 61 and is driven from a pulley 65 supported in the bracket arms 66 (see Figure 17) carried by the ends of the bars 61. The upper belt 47 derives its power from pulley shaft 58, and in order that the belt 47 may be adjusted relative to the belt 48 to accommodate packages of different heights or depths, a flexible adjustable drive is provided between these two belts. The pulley 65 similarly to the pulley 57 is fixed to a cross shaft 67 having one end journaled in the bracket arms 66, and its other end mounted in a bracket 68. A pair of box-like toggle elements 69 and 70 (see Figures 17 and 18) are pivotally mounted on the ends of the shafts 67 and 58 respectively and house suitable sprocket gearing extending from these shafts. The inner ends of the toggles 69 and 70 are pivotally connected to a stub shaft 71 passing through the toggles. With this arrangement, the power is taken from the shaft 58 through the sprocket gearing 72 which connects the shaft 58 with the stub shaft 71. A second sprocket gearing 73 housed in the toggle 69 connects the stub shaft 71 with the upper cross shaft 67. Thus, the power imparted to the shaft 58 is transmitted through the sprocket chains 72 and 73 to the shaft 67, pulley 65, and the upper belt 47. Furthermore, by reason of the flexibility of the toggle elements, the upper belt 47 may be raised and lowered with respect to the lower belt without affecting the belt drive or necessitating disassembly of the same. At the same time, both belts are synchronously driven at the same speed.

The upper belt 47 and its supporting elements 61 are carried by a plurality of cross beams 74 which also support the bracket 68. These beams are mounted in pairs at opposite ends of unit B. As clearly shown in Figures 16, 17 and 18, each set of spaced beams 74 is connected by cross braces 75 and is positioned below the cross rails 52. The extreme end portions of each set of beams embrace one of the upright rails 49 and a guide pulley 76 is journaled between each set of beams and is adapted to ride on the inner face of an upright 49. Thus, each upright 49 comprises a track upon which the end portions of each set of spaced beams is adapted to ride, with the rollers 76 facilitating the adjustment of the beams and preventing lateral movement of the same with respect to the uprights 49.

The mechanism for effecting adjustment of the beams 74 and of the upper belt 47 comprises threaded shafts 77, one mounted in each corner of the framework. As shown in Figure 18, each shaft 77 passes through an opening in its respective brace 75 and also through a nut 78 welded or otherwise secured to the under face of the brace. The upper end of each shaft 77 passes through a second cross brace 79 connecting adjacent cross rails 52. A worm wheel 80 is fixed to the upper end of the shaft 77 above the brace 79 and meshes with a worm 81 fixed to a cross shaft 82. As shown in Figures 10 to 18, there is a shaft 82 at each end of the frame, and each shaft is journaled in the top side rails 50. Suitable sprocket gearing 83 connects the shaft 82 and each shaft is provided with a squared extremity 84 for the reception of a suitable operating tool. Thus, with the present arrangement, and assuming that it is desired to either raise or lower the upper belt 47 to accommodate assembled stacks of different heights, it is necessary merely to rotate one of the shafts 82. This will impart rotation to all of the threaded shafts 77, and will raise and lower the cross beams 74 and the belt 47 supported thereby. This structure provides a very efficient means for adjusting the upper belt with respect to the lower without in any way disturbing the drive to the belts. Furthermore, a uniform synchronized drive of the belts is always provided and it is unnecessary to tear down or disassemble the driving connection between the belts when an adjustment is to be made.

Referring to Figures 10 and 11, it will be observed that the feed belts 47 and 48 are centrally positioned in the frame and are considerably smaller in width than the assembled stacks which are to be fed through the machine. At each side of the frame structure, and extending longitudinally thereof are units 85, which support the sides of the stacks and operate upon the side flaps to effect the folding and gluing operations. Each longitudinally extending unit 85 comprises a pair of inwardly presented spaced channel members or rails 86 suitably secured together and sustaining a flat flap supporting shelf 87. Each of the units 85 is supported at spaced intervals upon cross rods 88 which are mounted between the longitudinal rails 51. The specific means of connection between the rails 86 and the rods 88 comprise collars 89 slidably mounted on the rods 88 and rigidly connected to the lower flanges of the rails 86. To the inner rail 86 of each unit is also secured an angle iron 90 adapted to support the adjacent longitudinal edge of an assembled stack as it passes through the section. At the point where the stacks are received by the section B, a pair of vertically disposed guides 91 are mounted one on each unit 85. This is for the purpose of initially guiding each stack into the side flap folding and gluing section.

A pair of flap folders 92 are mounted at the receiving end of the section B, and, as shown in Figures 10 and 11, are provided with horizontal portions 93 overlying the shelves 87. Each flap folder 92 is gradually bent or curved downwardly from the horizontal portion 93 to form a vertical portion 94. These elements are adapted to contact the side flaps 22 of the top carton section, and, as the stack passes into the machine, fold these flaps downwardly and inwardly against the stack. While the side flaps of the top section are being folded down in this manner, the side flaps of the bottom carton section are supported in their unfolded condition upon the shelves 87, and in this manner are carried below glue applying rollers 95 of glue applicators 96 positioned at opposite sides of the section B. Each applicator is supported above its respective unit 85 by a bracket 97. This bracket supports a pair of arms 98 pivotally mounted on a stub shaft 99 journalled in the bracket 97. These arms carry the roller 95 and are joined at their free ends by a cross piece 100. A glue reservoir 101 is suspended within the arms 98 and is provided with arcuate end portions 102 normally urged into contact with the roller 95. The means for supporting the reservoir 101 in the glue applicator comprises a pair of studs or bolts 103 (see Figures 13 and 14) which pass through slots in projections 104 on the bracket 97 and are provided with nuts 105. Coil springs 106 surround the bolts between the reservoir 101 and the projections and normally urge the arcuate portions 102 into contact with the roller 95.

A second shaft 107 is mounted in the channel members 86 directly below the shaft 99 and supports a movable plate 108. This plate is rigidly connected to the inner end of the shaft 107 in close proximity to the inner channel member 86 (see Figures 13 and 14). At this point, the stack supporting angle iron 90 is cut away to receive the plate 108 so that the plate in reality constitutes a portion of the angle iron, and is adapted to engage one side of each lower carton section as it is fed through the machine. An arm 109 is fixed to the shaft 107 and the outer end of this arm is pivoted to a link 110 extending upwardly on the outer side of the glue applicator and pivotally connected to one of the arms 98. A stud 111 projects upwardly from a bracket 112 and passes through the cross piece 100. A coil spring 113 surrounds the stud 111 and normally urges the cross piece, arms 98 and roller 95 upwardly into the position shown in Figures 11 and 13. By reason of the connection between the plate 108 and the arms 109, the plate is normally tilted slightly above the level of the support 90. Thus, as the assembled stacks are fed through the section B, the weight of each stack as its longitudinal edges ride over the plates 108 urges each plate downwardly. This transmits motion through the shaft 107, arm 109 and link 110 to the arms 101 and roller 95, and thus presses the roller down upon one of the side flaps of the lower carton section as the stack passes this point. With this arrangement, an efficient gluing operation is assured.

Any suitable means may be employed for positively rotating each roller 95 in a counterclockwise direction. In the present instance, this comprises sprocket gearing 114 connecting the roller with the shaft 99, and sprocket gearing 115 extending from the shaft 109 to a cross shaft 116 which is journalled in the side rails 51 and imparts rotation to each sprocket gearing 115.

As shown in Figures 11, 14 and 16, the power for rotating the shaft 116 and the rollers 95 is taken off the main drive through sprocket gearing 117. Since the main drive through shaft 58 is clockwise, it is necessary that means be employed to drive the sprocket gearing 117 in a counterclockwise direction. This is accomplished by providing a combination gear and sprocket unit 115' at the extreme right hand end of the gearing 117 (see Figure 16). Unit 115' meshes with a like unit 116', the sprocket of which engages a sprocket chain 117' driven from the shaft 58.

At a point directly below each roller 95, the side flap supporting shelf 87 is broken away and a pair of spring plates 118 are provided to form extensions of the shelf and to permit a certain amount of flexibility when the roller is depressed. This arrangement facilitates the application of glue to the flaps as the stacks are fed through the machine.

After the side flaps of the lower section have passed through the glue applicator, they are still supported on the shelves 87. Each shelf, however, terminates at a point slightly beyond the gluing apparatus and merges into another flap folder 119 (see Figures 16, 17 and 18). The formation of this flap folder is just the reverse of the folder 92, that is, it has a lower horizontal portion 120 forming a continuation of the shelf 87 and merging into a portion 121 which is gradually bent or curved inwardly and upwardly and finally connects with a vertical portion 122. Thus, after the side flaps of the lower carton section have had glue applied to their inner or upper surfaces, they are subsequently folded inwardly and upwardly against the folded side flaps of the upper carton section during the passage of the assembled stack past the flap folder 119. The assembled stack as it reaches the end of the section B is therefore partially wrapped, that is, the side flaps of the upper carton section have been folded down and the upper or inner surfaces of the side flaps of the lower carton section have been glued and then folded up against the side flaps of the upper carton section.

*Top pressure roll section*

After the partially wrapped stack or package has passed through the section B, the belts 47 and 48 convey it into the section C where pressure is applied to the top carton section to compact the partially wrapped package and eliminate or expel any air pockets from the plywood sheets or panels. The open frame of section B is extended to support the elements of section C, and, in fact, the open frame extends throughout the sections B, C and D to support the different mechanisms for operating on the side flaps of the packages.

Each stack is fed off the belt 48 directly onto a belt 123 in line with and joining belt 48. This belt, similar to belt 48, is endless, and is supported upon and travels over a plurality of idle rolls 124. These rolls are supported between spaced longitudinally extending rails 125 and power for driving the belt 123 is taken from shaft 58 through the sprocket gearing 126. This gearing connects with a cross shaft 127 mounted in the side rails 125 and supporting an end pulley 128. The unit 85 including the longitudinally extending channels 86 is continued throughout the section C. Each partially wrapped package is not only supported by the centrally positioned belt 123, but also by the horizontal flanges of the angle irons 90. Furthermore, the vertical portions 122 of the flap folders 119 are continued so as to completely maintain the flaps in folded position. However, the distance that it takes the package to move from the glue applicator to section C is not sufficient to permit the glue to set before pressure can be applied to the top carton section.

The pressure applying mechanism comprises opposite pairs of weighted rolls 129. As shown in Figures 20 and 21, each set of rolls is carried by a bracket 130 and comprises four rolls 129 so positioned that they will come in contact with the top carton section adjacent one of its longitudinal edges. Each bracket 130 is mounted upon spaced posts 131 which are carried by a plate 132 supported on the angle members 86. The bracket is mounted for vertical adjustment on the posts 131 to permit the rolls 129 to be adjusted to accommodate stacks of different heights. In this connection, collars 133 are employed and these directly support the bracket and are vertically adjustable upon the posts 131. By loosening the set screws 133', the collars may be adjusted as desired.

Referring to Figure 21, it will be observed that the partially wrapped package is shown passing through section C, with the rolls 129 applying pressure to the top carton section. Normally, the rolls are in the position shown in dotted lines and they are raised to the full line position by the partially wrapped package itself as it passes under the rolls. Preferably, the first roll is mounted on the bracket at a point slightly higher than the remaining three rolls of each set, in order that pressure is gradually applied to the top of the package. If all of the rolls were in the same horizontal plane, it is possible that the pressure would be too abrupt and might crush or damage the package which is only partially wrapped at this point in its travel through the machine.

The total weight of the rolls 129 is considerable, and in order to assist the belt 123 in feeding each package past the rolls, a plurality of centrally disposed idle rolls 134 are employed. These rolls are mounted in a frame member 135 which in turn is suspended from a pair of longitudinally extending beams 136. One end of each beam 136 is secured to the bracket 66 of section B, while the other end is supported by the adjoining part of section D, as will be more fully described. Each roll 134 is carried by spring-pressed hangers 137 which exert pressure downwardly upon the central portion of the package directly over the belt 123. With this arrangement, the rolls 134 hold the package down against the conveyor 123 sufficiently to develop enough traction to feed the package under the weighted pressure rolls 129.

After the partially wrapped package has been compressed by the sets of rolls 129, it is then subjected to a further pressing action just prior to its entrance into the side flap sealing section D. This further pressing action is also applied to the top carton section and by means of a heavy pressure roller 138 extending entirely across the machine and mounted in brackets 139 suspended from side rails 140 which project rearwardly from and constitute part of the framework of section D. Roller 138 not only differs from the rolls 129 in size but as distinguished from these latter rolls, it is positively driven by a belt 141 which constitutes the top conveyor element of section D. This belt is of the endless type and engages a centrally located depressed portion or groove 142 formed in the roller 138.

Directly below and in line with the roller 138 are mounted two small rollers 143 which assist the lower frame structure in supporting the partially wrapped packages as they pass under the roller 138. Consequently, the rollers 143 cooperate with the roller 138 for transmitting a final pressing action to the top and bottom of the packages. Each roller 143 is mounted at its outer extremity in a support 144 carried by the side rail 51. The inner end of each roller 143 is journalled in a bracket 145 carried by a pair of cross beams 146 extending across and supported by the side rails 51.

With the foregoing arrangement, the partially wrapped packages, after the side flaps have been glued and folded, are thus subjected to pressure applied to the top carton section before the glue has had time to set, whereby the panels and the carton sections are compressed to eliminate any air pockets in the panels and to insure a compact package.

*Side flap sealing section*

Immediately after each partially wrapped package passes under the pressure roller 138, it is fed between mechanism which applies pressure to and completely seals the folded and glued side flaps. The package is fed through the section D between the aforementioned top belt 141 and a bottom belt 147. The belt 147 substantially abuts the belt 123 and in fact, feeds and partially supports the package as it is being moved under the large pressure roller 138. This belt, similarly to the belt 123, is endless and is supported upon a plurality of idle rolls 148 carried in a frame member 147', similar to the frame member 60 of section B, and rails 125 of section C. In fact, the member 147' constitutes a continuation of these other members.

The lower run of the top belt 141 is carried over a plurality of spring pressed idle rolls 149 mounted in a frame member 150 in a manner similar to the top conveyor belt 47 of section B. Furthermore, and similarly to the upper and lower belts of section B, the upper belt 141 derives its power from a cross shaft 151 and this in turn acquires its power from the lower cross shaft 152 through sprocket gearing 153. This gearing is identical with the toggle gearing 69—73 connecting the shafts 67 and 58, shown in Figures 17 and 18. The source of power which operates the belts 141 and 147 is separate and distinct from that which actuates the belts 47 and 48. This arrangement will be subsequently described in greater detail.

The top belt 141 and its supporting structure 150, together with the large pressure roller 138, are suspended from pairs of adjustable cross-beams 154 (see Figures 21 and 23) carried at opposite ends of the side flap sealing section D. Since these beams 154 and the adjusting mechanism are similar in all respects to that described with respect to the adjustment of the top belt 47 of section B, it will not be described in detail, other than to point out that by rotation of one of the shafts 155, the screw shafts 156 will be actuated and will move the cross-beams 154 vertically in the frame structure of section D, and thereby adjust the upper belt 141 relative to the belt 147. In fact, the arrangement is such that operation of any of the shafts 155 or 82 will simultaneously adjust the upper belts 47 and 141. At the same time, the large roll 138 will be adjusted, as will the set of idle spring pressed rollers 134 of section C. This latter operation is accomplished because the side rails 136 extend between and are connected to the cross-beams 52 of section B and the cross-beams 154 of section D. Thus, by actuating a suitable crank, such as shown at 157 in Figure 21, all of the above mentioned mechanism may be simultaneously adjusted to accommodate packages of different heights.

As each partially wrapped package is fed between the belts 141 and 147, it passes between side flap compressing units 158. These units are positioned at opposite sides of the frame and in position to receive, compress and seal the glued side flaps of the partially wrapped packages. Each unit is mounted on a supporting base comprising a pair of spaced longitudinally extending rails 159. These rails are connected by cross braces 160 and in a manner similar to the units 85, the inner rail of each unit carries a package supporting element 161. These elements cooperate with the belt 147 to support the package as it is fed through section D. To the outer rail of each unit are connected a plurality of brackets 162 and these cooperate with the cross braces 160 to adequately support a frame element 163. This element includes upper and lower channel members 164 within which are mounted pairs of spring pressed hangers 165, each pair of hangers carrying an idle roll 166. These rolls are spring pressed into engagement with the inner run of an endless belt 167 (see Figures 21 to 24). Each of the side rails 159 is connected to a collar 168 and these collars are slidably mounted on a cross rod 169 for a purpose presently to be described.

The spaced belts 167 are not power driven but are merely moved by frictional engagement between the belts and the sides of the packages as they are fed through the section D. As each partially wrapped package passes into section D, the folded and glued sides thereof are immediately brought into contact with the belts 147. It is to be assumed that these have been adjusted to a position where the rollers 166 will be placed under tension and thus impart pressure through the belts to the folded and glued side flaps. The belts are of sufficient length to permit the glue to set and completely seal the side flaps before the package has passed through this sealing section.

As each package reaches the end of the sealing section D and just prior to its movement onto the transfer section E, means are provided to effect an initial creasing or folding of the front set of corner flaps 24. This means (see Figures 25, 26 and 29) comprises a pair of spaced arms 170 which are pivotally mounted on adjustable brackets 171 carried at the extreme end of the compressing units 158. The arms 170 are hinged to the brackets 171 by suitable hinges 172 and are normally spring pressed by concealed springs (not shown) into position to contact and fold-in the front corner flaps of each package as it passes through the side sealing section. This initial creasing action is desirable, since the front set of corner flaps would otherwise be exposed to a crushing action by certain elements of the transfer mechanism as the package reached the end of its travel through the sections B, C, D and E. These corner flaps are thus folded in and protected against damage and are in position to be permanently folded or tucked-in, as will be hereinafter described.

As has been described, means are provided to adjust the top belts and pressure rollers to accommodate packages of different heights. Means are also provided throughout the sections B, C and D to adjust the different mechanisms mounted in the lower frame structures for accommodating packages of different widths. In other words, the present machine is capable of wrapping packages of various sizes. In this connection, and referring first to Figures 10 and 12, it will be recalled that the units 85 are provided with collars 89 which are slidably mounted on cross rods 88. At spaced points, the outer rails 86 (Figures 12 and 19) are provided with collars 173 which have threaded openings cooperating with threaded cross shafts 174 mounted between the side rails 51. Each of the shafts 174 is connected by sprocket gearing 175 and this gearing is operatively associated with a threaded shaft 176 connected with the bracket 130 carrying the rolls 129 of section C. Furthermore, the gearing extends to threaded shafts 177 mounted in the sealing section D and associated with the supporting units 159 (see Figures 20, 21 and 22). It is to be understood that all of the threaded shafts are divided into right and left hand threads whereby when the sprocket gearing is actuated, the spaced side flap folding, gluing, and sealing units are moved inwardly and outwardly with respect to the center of the machine and to each other and thus are capable of adjustment to accommodate packages of different widths. All of these elements may be operated manually but it is desired that the sprocket mechanism connecting the same be associated with a main sprocket wheel 178 preferably mounted on one of the shafts 177 and connected with any prime mover or any other suitable source of power 178' (see Figure 2). With this arrangement, it will be apparent that by rotation of the sprocket wheel 178, all of the shafts 174, 176 and 177 will be rotated in unison and the entire side gluing, folding, pressing and sealing mechanism will be simultaneously adjusted to take care of packages of varying widths.

*Transfer section*

The partially wrapped package, as it is discharged from the side flap sealing section D, will resemble the package shown in Figure 5, with the exception that the front corner flaps will have been creased and partially folded in by reason of their contact with the spring pressed arms 170. The package is then fed onto the transfer section E by a top conveyor belt 179 carried by the belt frame 180 which forms a continuation of the frame member 150 of the side belt section D. The extreme end of the frame 180 is suspended from a pair of cross beams 181 corresponding to the cross beams 74 and 154 of the sections B and D respectively. The beams 181 are also adjustably mounted in the machine frame by the threaded shaft 182 and the cross shaft 183. This adjusting mechanism is similar in all respects to the aforementioned top belt adjusting mechanism and will not be described in detail. The shaft 183 is, however, connected to the cross shaft 155 by suitable sprocket gearing 184 whereby the top conveyor 180 is simultaneously adjusted with the top conveyor units of the sections B, C and D. The belt 180, similar to the other top belts, is pressed into contact with the top of the package by idle rolls 185 which are normally spring pressed against the lower run of the belt. This belt derives its power from the cross shaft 151 through sprocket gearing 186. Thus, the partially wrapped package, as it leaves the section D, advances under the belt 180 and is conveyed thereby onto the transfer mechanism, as shown in Figure 26.

The transfer mechanism comprises a table made up of two roller supporting grids 187 and 188. The grid 187 carries a plurality of long rollers 189 extending transversely of the grid and normally in position to receive and support the packages as they are discharged from the sealing section D. These rollers are mounted in spaced relation upon uprights 190 which in turn are secured to the grid frame 191, this frame being adjustably mounted in the transfer mechanism to permit the rollers 189 to drop below rollers 192 carried by grid 188. The rollers 192 are relatively short, and are mounted in spaced rows between the long rollers 189. That is, the several sets of rollers are mounted on their respective grids in such a manner that the long rolls 189 alternate with the rows of short rolls 192, as clearly shown in Figures 25 and 26. Each row of short rollers 192 are mounted between channels 193 which are supported on the grid 188, this grid being rigidly mounted in the supporting frame 194 of the transfer mechanism (see Figure 29). The frame 191, supporting the long rollers 189, is provided with sets of spaced cross channels 195 within which are journalled cam engaging rollers 196. These rollers directly contact and are supported upon cams 197 fixed to cross shafts 198 journalled in the frame structure of the transfer mechanism.

Figure 29:
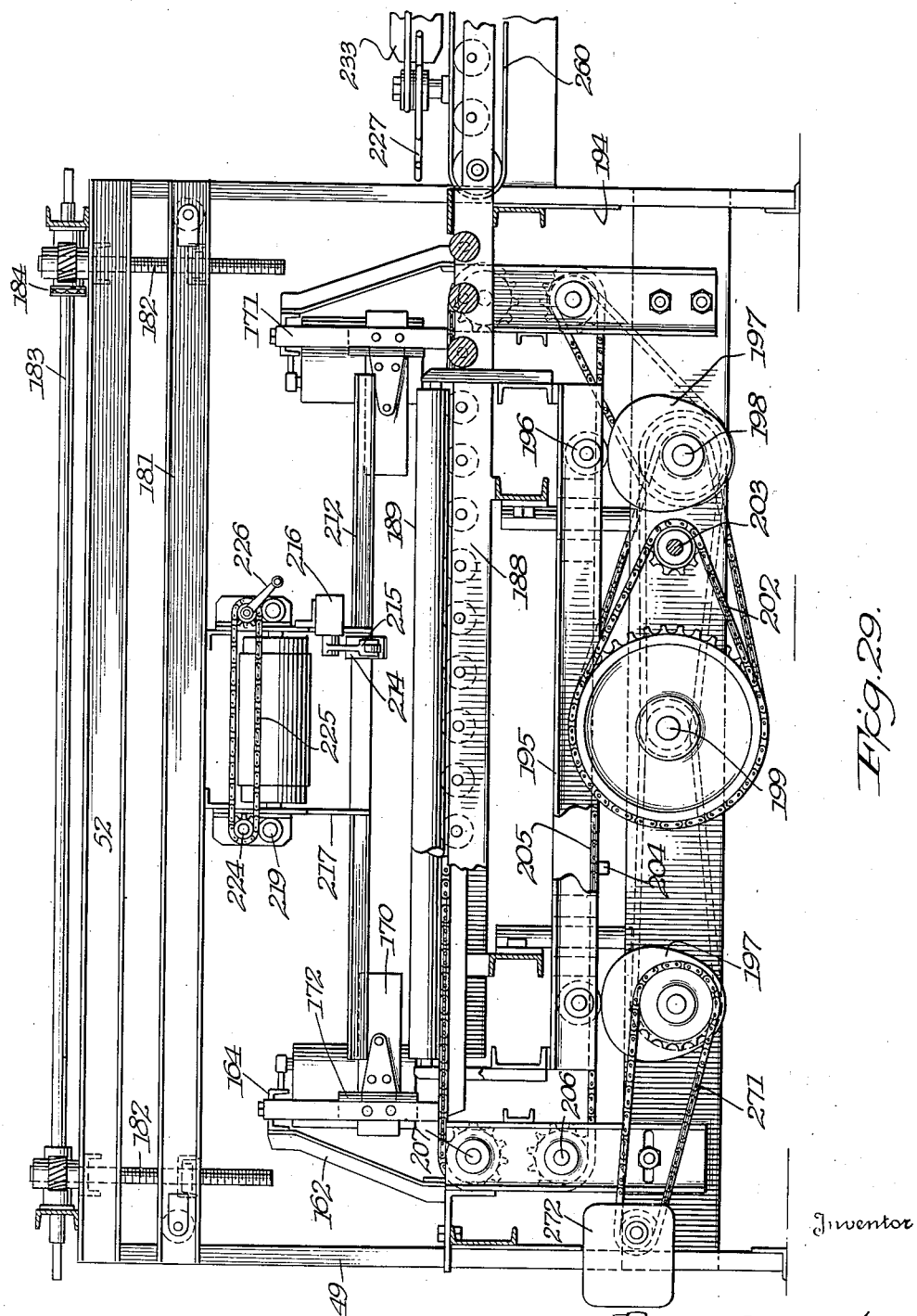
Figure 29 is an end elevation of the transfer mechanism partly in section.

In the position shown in Figures 26 and 29, the cams 197 are in position to support the rollers 189 above the rollers 192, in position to receive and support the package from the sealing section D. However, when the cams are rotated by suitable mechanism, to be hereinafter described, the grid 187 and rollers 189 will be lowered below the level of the rollers 192. This operation will shift the package from the rolls 189 to the rolls 192 where it will be in readiness to be moved off the transfer mechanism in a direction transverse to its original direction of movement through the sections B, C and D. The shafts 198, upon which the cams are mounted, are operatively connected to a shaft 199 by suitable sprocket gearing 200 and 201 respectively, and this shaft 199 is in turn operated through sprocket gearing 202 from a main drive shaft 203 operated by any suitable prime mover or source of power, to be hereinafter described. This mechanism controls the speed of rotation of the cams 197 to properly raise and lower the grid 187 with respect to the grid 188.

When the package has been lowered by the rolls 189 so that it rests entirely upon the rows of small rolls 192, means are employed to move the package into the end flap folding and gluing section F. This means comprises a pusher or draper bar 204 carried between sprocket chains 205, each chain being associated with a set of sprocket wheels 206 mounted in one side of the frame of the transfer mechanism. The arrangement is such that the upper run of the chains 205 is normally located below the rollers 189 when said rollers are in their extreme top position (see Figures 26 and 29). However, the upper run of each chain is so positioned with respect to the rows of small rolls 192 that the draper bar 204 will travel in a horizontal path slightly above the rolls 192. It is to be understood that the rollers 189 are lowered to their lowermost position below the rollers 192 before the chains 205 are operated to move the bar 204 to package engaging position. During this travel, the draper bar will engage a side of the package and move it over the rolls 192 until it is finally deposited upon the front end of the end folding and gluing section F. The sprocket wheels 206 (see Figures 29 and 30) are carried on shafts 207 and these shafts are driven through sprocket gearing 208 and 209 from the main shaft 199. Since the gearing 208 and 209 are driven at a greater rate of speed than the shaft 198, the sprocket wheels 208' and 209' are loosely mounted on shaft 198. To insure that the grid 187 is properly guided and retained against lateral movement, a plurality of posts 210 are carried by the stationary grid 188. A sleeve 211 embraces the post 210 and is carried by one of the rails 195 which support the rollers 196 (see Fig. 27). Thus, as the grid 187 is raised and lowered, each sleeve 211 is likewise moved up and down on its post 210 and thereby guides the grid and holds it against any side sway or lateral movement.

With the transfer mechanism as thus far described, and assuming that a package has been delivered thereto and has operated a switch mechanism (to be hereinafter described), controlling the prime mover which rotates the drive shaft 203, the mechanism will be set in operation. It is to be understood that the movement of the draper bar 204 is so synchronized with the raising and lowering of the grid 187, that the bar will make one complete trip on the chains 205 while the cams 197 are being rotated once by the shafts 198. The cams will initially lower the rollers 189 below the level of the rollers 192. Since it is necessary that the rolls 189 be lowered before the draper bar reaches the upper run of the sprocket chain 205, the bar at its starting and stopping point, is preferably located in the position shown in Figure 29. Thus, the cams 197 will have had an opportunity to lower the rolls 189 before the bar 204 has reached the upper run of the sprocket chains. This bar, as above described, then engages one side of the partially wrapped package and moves it over the rolls 192 off the transfer section E and upon the section F. This mechanism is so designed that the package will have been completely discharged from the transfer mechanism before the cams 197 return the rollers 189 to their upper position. Furthermore, the draper bar will have travelled down and around to its initial starting position and will be ready for the next transfer operation.

The means for controlling the operation of the transfer mechanism is in itself, controlled by the partially wrapped package as it is deposited upon the rollers 189. This mechanism includes a cross bar 212 suspended above the transfer mechanism in position to be engaged by the front end of the package as it is received on the transfer mechanism (see Figure 26). The bar 212 carries a rod 213, one end of which projects rearwardly of the bar and is connected to an inclined switch engaging plate 214. This plate is directly in line with a pivoted spring arm 215 of a switch element 216 and is normally spaced from said arm. The cross bar 212 is carried by a pair of brackets 217, each of which is connected to one of a pair of spaced horizontally slidable carriages 218, as shown in Figures 26 and 28. Each carriage is slidable upon a rod 219 carried by the upper conveyor frame 180 and is limited in movement on said rod by the arms 220 of a yoke 221. A collar 222 carried by each carriage 218 surrounds its respective rod and limits the rearward movement of its carriage.

When a package enters the transfer mechanism, it is carried by the belt 179 over the rollers 189 until it strikes the cross bar 212. This action will move the cross bar and carriages 218 rearwardly until the collars 222 engage the rear arms 220. Such movement of the cross bar will carry the inclined plate 214 into engagement with the switch arm 215 and thus operate the switch 216. This will place the transfer motor (to be hereinafter described) in operation, which will actuate the drive shaft 203 and place the transfer mechanism in operation. At the same time, and as will be explained in more detail hereinafter, the circuit to the motor which operates the belts 179 and 141 will be opened and thus render these belts inoperative. The arrangement is such that, as the package strikes the cross bar 212, the belt 179 will be rendered inoperative and the transfer mechanism placed in operation. The switch 216 will remain closed until the crossbar 212 is released by the package. The arm 215 being spring pressed is moved back to its original position and the spring pressure is sufficient to also move the carriages forwardly on the rods 219. This will likewise return the cross bar 212 to its original position where it is ready for the next package. It is to be understood, however, that switch 216 is closed until the first package moves off the transfer mechanism. As shown in Figure 29, the cross bar 212 extends substantially across the transfer mechanism so that by the time the end of the package passes out of contact with the bar, it will have substantially cleared the transfer unit and will have been received in the end flap gluing and folding section.

In order to accommodate packages of different lengths, the cross bar 212 is mounted for horizontal movement relative to the transfer mechanism. The means for accomplishing this adjustment comprises a pair of threaded shafts 223 mounted on opposite sides of the frame 180. Each shaft is positioned above and in parallel relation to one of the rods 219 and passes through a longitudinally extending threaded opening in its respective yoke 221. The shafts 223 project beyond the end of the transfer supporting frame structure and have secured to their extreme ends, sprocket wheels 224 which are connected by a sprocket chain 225. A suitable crank 226 is connected to one of the sprocket wheels 224 and upon rotation of the crank, both of the shafts 223 are rotated. This operation moves the yokes 221, carriages 218 and the cross bar 212 horizontally with respect to the transfer mechanism and in the line of travel of the packages passing to the transfer section. Thus, the bar may be adjusted to any desired position above the transfer mechanism to accommodate packages of various lengths.

*Corner flap folder*

As the partially wrapped packages pass from transfer section E to the end flap folding and gluing section, means are provided to fold or tuck in the corner flaps 24 of both carton section and to maintain these flaps in such folded condition while the end flaps 23 of the top carton section are being folded down upon the corner flaps. The tucker mechanism is positioned at the front of the frame structure supporting the end flap folding and gluing mechanism and constitutes a pair of wheel shaped members 227, one positioned at each side of the frame structure as shown in Figures 25 and 31. Each tucker element comprises a plurality of radial spokes 228 carrying at their outer end, arcuate sections 229 which are spaced from each other sufficiently to permit a corner flap to be received between adjacent sections. Each tucker is rotated by a motor 230 mounted on the side rail 231 of the section F. Normally, the tucker elements 227 are stationary and are not rotated until a package operated switch arm 232 closes the circuit to the motors 230. It will be understood that it is not necessary to rotate the tucking mechanism for folding in the front set of corner flaps. By front corner flaps, I mean those flaps which are now at the front of the package as it is moved in its transverse direction and which during the original movement of the package, constituted the front and rear corner flaps located on one side of the package.

As the front of the package moves past the tucker elements 228, these will automatically engage and fold back the forward set of corner flaps against the package. These flaps will be maintained in this folded position upon further forward movement of the package by the side guide plates 233. When the front of the package has engaged and thrown the switch arm 232, the motors 230 will rotate the tuckers just before the rear set of the corner flaps move into engagement with the tuckers. These tuckers are so arranged that they will engage the rear set of corner flaps and fold them forwardly and inwardly against the sides of the package. It will be observed that the forward ends of the tuckers overlap the rear ends of the guide plates 233 and also pass through centrally disposed slots 234 formed in the ends of these plates. Thus, the plates cooperate with the tuckers to maintain the folded rear set of corner flaps against the package until the end flaps of the top carton section are folded down over the corner flaps.

It will be appreciated that the switch block 235 carrying the arm 232 must be positioned at a predetermined point in advance of the tuckers 227, in order that the tuckers will be placed in operation prior to the passage of the end of the package past the tuckers. Since the wrapping machine is adapted to accommodate packages of different sizes, it is necessary, therefore, that the switch block 235 be adjustably mounted. Furthermore, this adjustment must be synchronized with the mechanism for adjusting the side flap folding and sealing units. This adjustment is provided by slidably mounting the switch block 235 in the section F. Referring to Figures 31 to 33, it will be observed that a pair of plates 236 and 237 are rigidly carried by the conveyor frame 235' of section F. These plates are so designed that they cooperate to form an L-shaped slot 238. This slot receives an L-shaped lug 239 connected to the switch block whereby the block is confined within the slot but is capable of longitudinal slidable movement therein.

The means for adjusting the switch block in the plates 236 and 237 comprises a cable 240 connected to the front end of the switch block and passing around pulleys 241 and 242 mounted in the side plates. As shown in Figures 25 and 31, the cable then passes downwardly and around a pulley 243 preferably connected to the flooring and then extends upwardly to and around a pulley 244 mounted on the frame structure of the side flap sealing section D. The cable finally passes around a pulley 245 carried by the outer side rail 246 of one of the adjustable side sealing units, and has its end portion secured to the frame structure. In order that the switch box 235 be maintained in its required adjustment, and since there must be no slack in the cable 240, means are provided to place a constant tension on the cable and to effect a rearward pull on the switch box. This means comprises a second cable 247 having one end secured to the rear of the switch box and passing over pulleys 248 carried by the plate 237. The cable 247 then extends downwardly preferably through a hole in the flooring, and has its free end fastened to a weight 249.

In adjusting the side folding, gluing and sealing units to take care of packages of different widths, it will be apparent that each of these units moves only half of the actual distance of adjustment. That is, the side rail 246 of the sealing unit 158 to which the pulley wheel 245 is connected, will move only one-half of the actual distance of adjustment. Therefore, it is necessary that this discrepancy be taken care of in adjusting the switch box 235 and to assure that the distance the switch box is moved, is twice the distance of movement of the side rail 246. This is accomplished (see Figure 25) by doubling the cable around the pulley 245. Thus, any adjustment of the side seating section to accommodate packages of different widths, will be correctly transmitted through the pulley 240 to the switch box 235. Since the movement of the package as it passes through the tucking mechanism is transverse to its initial movement through the side sealing section, the package is actually travelling sidewise rather than lengthwise. Therefore, it will be apparent that any adjustment of the switch box 235 is to take care of adjustments in the width of the package rather than in the length.

End flap folding, gluing, and sealing

After the tucking or corner flap folding operation has been completed, the package then passes successively through sections F, G and H which fold, glue, press and seal the end flaps of both carton sections. Since this operation is substantially a duplication of the side flap folding, gluing, pressing and sealing operations, and since the structure is substantially the same as that shown and described relative to the side flap operating mechanism, it is not deemed necessary to specifically illustrate and describe this structure. Therefore, this mechanism is shown diagrammatically in Figure 3 of the drawings and will be described with respect to this figure and Figure 31.

Referring to Figures 3 and 31, there are provided a pair of flap folders 250, corresponding to the flap folders 92, which engage the end flaps of the top carton section and fold them down against the sides of the package and also against the folded corner flaps which have been tucked in just prior to the movement of the package past the folders 250. The package is then fed past a pair of glue applicators 251, corresponding to the glue applicators 96, which apply an adhesive to the upper surfaces of the end flaps of the bottom carton section. As the machine continues to travel through the section F, a pair of flap folders 252 (see Figure 3) engage the glued end flaps of the lower carton section and fold them against the folded end flaps of the top carton section. It will be observed that no upper belt conveyor is provided in section F as in section B. This is not necessary during the end flap gluing and folding operation, since the carton sections are at this time sufficiently secured to each other by reason of the folding and gluing of the side flaps, and thus do not need to be maintained in proper relation to each other and to the panels. Thus, a top conveyor would be superfluous, although it is to be understood that one may be provided if desired.

The package then passes from section F to the pressure applying section G, which is similar in all respects to the section C with the exception that the large transversely extending pressure roll is eliminated. Sets of pressure rolls 253, similar to the rolls 129, are provided since it is desirable that pressure be applied to the longitudinal edges of the package to give a final pressing action at this point before the glue has set on the end flaps.

The package is then fed to the end flap sealing section H which is identical with the section D with the exception that the top conveyor belt is eliminated for the same reason that the top belt is eliminated from section F. However, opposite pairs of end flap sealing belts 254 are provided which are identical with the belts 167 of section D.

The completely wrapped package finally emerges from the machine in the form shown in Figure 6 and is in condition for immediate shipment. A receiving table 255 may be provided if desired and a waxing element 256 is positioned directly beyond the section H. This element comprises a pivoted wax holder which is resiliently connected to the end of section H and is adapted to wax the undersurface of each package as it emerges from the end flap sealing section. This is for the purpose of facilitating shipment and preventing scuffing of the cartons as they are stacked or placed one upon the other.

It is to be understood that the end flap folding, gluing, pressing and sealing sections F, G and H are capable of adjustment similar to the sections B, C and D. That is, threaded shafts, collars, and sprocket gearing are associated with the several spaced units whereby these sections may be adjusted to accommodate packages of various lengths. This adjusting mechanism is similar to the means for adjusting the sections B, C and D for packages of different widths, and is therefore not specifically illustrated in the drawings other than to indicate the motor 256' (see Figure 3) operatively connected to one of the threaded shafts 256" mounted in section H.

Switch control mechanism

It is, of course, possible that the wrapping machine as thus far described, may operate satisfactorily without any switch control mechanism for the packages, but in order to prevent any crowding of packages as they pass through the machine, and particularly, to any package which is being transferred from the side flap operating mechanism to the end flap mechanism, means are provided for positively controlling the passage of the packages through the machine and for assuring that there will always be sufficient space between adjacent packages.

Referring to Figures 2, 3 and 7, it will be observed that the belts 47 and 48 for conveying the packages through the side flap folding and gluing section B are operated from an electric motor 257. The belt 123 for moving the package through section C is also operated from this motor. The drive for the upper and lower belts 141, 147 of the side flap sealing section D is from the electric motor 258 which also controls belt 179 located above the transfer section E. The drive for the transfer mechanism is through the motor 259. The drive for the belt 260 of the end flap folding and gluing section F is through the motor 261 and this motor also drives the belt 262 which feeds the packages through the section G. The motor 263 drives the conveyor belt 264 of the end flap sealing section H.

Referring now to Figure 7 which discloses the wiring diagram for the different motors, when the main switch 265 is closed, this will energize an under voltage relay switch 266 which will close the circuit to the motor 257 and place the belts 47 and 48 in operation to feed the packages through section B. The circuit to the motor 257 is normally closed so that the belts 47, 48 and 123 are continuously operated, except under conditions when a package is in the transfer mechanism, as will be shortly described. Furthermore, the motor 261 will always be operative to drive the belts 260 and 262 of sections F and G, when switch 265 is closed.

As distinguished from the belts of section B and C, the belts 141 and 147 of the side sealing section are normally inoperative. The motor 258 is controlled by two limit switches 267 and 268 respectively. These limit switches are normally open and are adapted to be closed by the packages themselves passing through the machine and to return to their open positions after being released by the packages. Switch 267 (see Figures 1 and 2) is mounted on the framework of the machine in the path of the packages and at a point directly in advance of the front end of the belt 141, whereas switch 268 is located beyond switch 267 at a distance not greater than the length of the shortest sized package to be wrapped. In other words, a package is adapted to close switch 268 before its rear end has passed switch 267. Since the belts 48 and 123 are continuously operated, a package passing through section C will strike limit switch 267, closing the circuit to the motor 258 and thereby placing the belts 141, 147 and also 179 in operation. As the package advances into section D, the switch 267 will remain closed while the package engages and closes switch 268. Thus, for an instant, both switches will be closed, but switch 267 will be thrown open as soon as it is released from contact with the rear end of the package. However, since the package is holding switch 268 closed, the motor 258 will continue to operate the belts 141 and 147 until the package passes the switch 268, whereupon the circuit to the motor 258 is opened and the belts 141 and 147 are rendered inoperative. At this point, however, the package is well advanced into the side flap sealing section D and since the sealing units of this flap are constantly in engagement with the glued and folded side flaps, an effective sealing action is produced when these belts are inoperative, as well as when the package is being fed through section D.

Assuming that another stack of panels have been assembled on the table A and introduced into the section B, this assembled stack will be fed as above described and will eventually close the limit switches 267 and 268, thus energizing the motor 258 and again placing the belts 141 and 147 in operation. This advances the first mentioned package further in the section D and the second package to the position occupied by the first package. As this operation continues, and assuming that assembled stacks are constantly being fed into the section B, the first partially wrapped package will move onto the transfer section E and eventually strike the cross rod 212, closing the switch 216. This will close the circuit to the motor 259 and operate the drive mechanism to the transfer table. Since the relay switch 266 is an under voltage relay, it will be rendered inoperative immediately the circuit to the motor 259 is closed. This would ordinarily render the motor 257 inoperative but, as will be presently described, this motor is energized by another circuit when the drive mechanism of the transfer table is actuated.

As soon as the transfer mechanism has been placed in operation, a pair of cam switches 269 and 270 are closed (see Figure 7). The closing of these switches is controlled by operation of one of the cams 197 through sprocket gearing 271 which connects with the cam switch box 272 housing the switches 269 and 270 (see Figure 29). Switch 269 controls relay switches 273 and 274, the relays of which are normally de-energized but which, upon the closing of the switch 269, become energized and open the circuit controlling the motor 258. Thus, when the relays 273 and 274 are energized, the conveyor belts 141, 147 and 179 will be rendered inoperative regardless of the position of the limit switches 267 and 268, and thereby prevent any crowding or feeding of a package into the transfer mechanism E, when the latter is in operation.

The switch 269 is designed to remain closed throughout substantially one-half revolution of the cam 197. During this half revolution of the cam, the package in the transfer section will have been conveyed by the draper bar 204 off of the transfer section. With the transfer section clear, there is no need for the conveyors 141 and 147 of the side sealing section D to remain inoperative and they are rendered active by opening of the cam switch 269, which again renders the relays 273 and 274 inoperative and thus permits the limit switches 267 and 268 to function in their accustomed manner.

The cam switch 270 is primarily adapted to maintain the circuit to the transfer motor closed during a full revolution of the cam and this switch therefore remains closed after the switch 269 has been opened and also after the switch 216 is opened by the passing of the package beyond the confines of the cross-bar 212. In this connection, it is to be understood that switch 216 functions more or less as a means to initially start the transfer mechanism and that the subsequent operation of this mechanism is controlled by the cam switches 269 and 270. Thus, when switch 216 is finally permitted to return to its normally open position, it does not close down the transfer mechanism but is merely reset to again function as an initial starting switch for the transfer mechanism when the next succeeding package arrives on the transfer table.

It is important that the transfer mechanism be operated during the complete revolution of the cams 197. This is necessary, not only to raise the grid 187 and the long rolls 189 to their top position, but also to move the draper bar 204 around to its original starting position (see Figure 29). Thus, the function of the switch 270 is to maintain the circuit to the transfer motor 259 closed until the moving elements of the transfer mechanism have had an opportunity to return to their original starting positions, and thereby be correctly located to receive and operate on the next succeeding package as it enters the transfer mechanism.

Referring again to the sections B and C, it will be observed that a normally open limit switch 274' (see Figures 1 and 7) is mounted on the frame at a point between these two sections. This switch, similar to switches 267 and 268, is positioned in the path of the packages as they are conveyed from station B to C. Switch 274', however, is normally closed and is adapted to be opened by each package as it passes by the switch. By referring to the circuits, it will be apparent that switch 274' will have no effect upon the operation of the motor 257 when the switch 266 is closed and when the transfer mechanism is inoperative, that is, regardless of the position of switch 274' it will have no effect on the operation of motor 257 when switch 266 is closed. However, when the transfer section is rendered operative by the closing of switch 216 by a package, the closing of cam switch 269 closes another circuit to the motor 257 through the switch 274'. In other words, motor 257 is energized by one circuit through switch 266, when the transfer mechanism is inoperative, and is energized by another circuit through switches 269 and 274' when the transfer mechanism is in operative position and switch 266 is open.

Assuming now that a package has entered the transfer mechanism, and that another package is resting on the switches 267 and 268, operation of motor 259 will open the circuit to motor 258 regardless of the position of switches 267 and 268 and the progress of this last package will be stopped and it will remain in contact with switches 267 and 268, since the belts 147 and 148 are closed down. However, belts 47, 48 and 123 of sections B and C will be running, since motor 257 is still energized through its second circuit. Thus, any package which is introduced into section B from the assembly table A will be moved forwardly by the belt 47 and 48 until the front end of the package engages switch 274' and opens the same. This will immediately open the second circuit and render motor 257 inoperative, closing down the belts 47 and 48 and holding this last package in position to subsequently proceed into section C. It will be apparent that without switch 274' the last package entering section B when the transfer mechanism is in operation would collide with the package resting on switches 267 and 268 and damage both packages and possibly the machine. With the present construction, however, this discrepancy is taken care of and the proper spacing of the packages in the machine is effected.

As soon as the first package has left the transfer table and the cam switches 269 and 270 have been opened, the relay switches 273 and 274 will be closed. The motor 259 will be deenergized, thus closing switch 266 and again closing the first circuit to the motor 257. The second circuit is opened as soon as switches 269 and 270 are opened. Thus the belts 47, 48 and 123 will operate regardless of the position of the switch 274' and belts 147, 148 and 179 will operate when the switches 267 and 268 are closed. This will continue until another package enters the transfer mechanism, whereupon the above described sequence of operations will again take place.

The means for actuating the corner flap tuckers and the end flap folding, gluing and sealing units may be rendered inoperative by opening a switch 275. However, under ordinary conditions, it is desired to operate all of the sections of the machine and the switch 275 is therefore closed (see Figure 7). Thus, as each package is moved into section F from the transfer mechanism E, it will close the switch 235 and place the tucker or corner flap folding motors 230 in operation.

As previously described, the motor 261 will function to drive the belts 260 and 262 of section F as long as switch 265 is closed. Therefore, each package as it leaves the transfer section E is received on belt 260 and conveyed through the end flap folding and gluing section F.

As each package passes through the section F, it will eventually come into contact with and close a switch 276 located in advance of the end flap sealing belt 264. This switch controls the motor 263 and thus places the belt 264 in operation to receive and convey the package from the belt 262. In a manner similar to the operation of the limit switches 267 and 268 of section D, the belt 264 will be operated as long as the package is holding the switch 276 closed. Thus, when the package passes beyond the switch 276, this will automatically open and close down the conveyor belt 264. The package will then remain stationary in the end flap sealing section until the next succeeding package throws the switch 276 and again energizes the motor 263. The packages will eventually be discharged from section H, pass over the waxer 256 and onto the discharge table 255, where several operators will be in position to stack the wrapped packages or remove them for immediate shipment.

While I have specifically designated the present machine as being particularly useful in wrapping plywood sheets or panels, it is to be understood that the machine is capable of wrapping various articles within a relatively large range of sizes. Furthermore, while the machine is particularly adapted for working on cartons which are provided with side, end and corner flaps, it is, of course, capable of wrapping material in sectional cartons wherein the corner flaps are eliminated. In this connection, it would be necessary merely to cut out the motors controlling the tucker elements 228. In fact, since these elements would not in any way interfere with the folding of the end flaps, it is apparent that the mechanism need not be changed in any manner. If desired, the package supporting rails 90 and 161 may be provided with, or have substituted therefore, ballbearing rollers, wherever it is deemed necessary. Such rollers would be employed to eliminate drag or friction on the bottom of the packages as they travelled through the machine. It is to be further understood that such variations in the method and machine herein shown and described as are within the skill of a mechanic may, of course, be made without departing from the range of my invention.

I claim:

1. The method of wrapping plywood panels or the like in sectional cartons wherein each carton section is provided with side and end flaps, comprising placing a stack of panels on one carton section, placing the other carton section on top of the panels, folding one set of opposite flaps of one section, gluing and folding the corresponding opposite flaps of the other section upon the first set of folded flaps, then folding the other set of opposite flaps of the first section, and gluing and folding the remaining flap of the second section upon the second set of folded flaps of the first section.

2. The method of wrapping plywood panels or the like in sectional cartons wherein each carton section is provided with side and end flaps, comprising placing a stack of panels on one carton section, placing the other carton section on top of the panels, folding down the side flaps of the top section, gluing and folding up the side flaps of the bottom section upon the folded side flaps of the top section, then folding down the end flaps of the top section, and gluing and folding up the end flaps of the bottom section upon the folded end flaps of the top section.

3. The method of wrapping plywood panels or the like in sectional cartons wherein each carton section is provided with side, end and corner flaps, comprising placing a stack of panels on one carton section, placing the other carton section on top of the panels, folding down one set of opposite flaps of the top section, gluing and folding up the corresponding opposite flaps of the bottom section upon the folded flaps of the top section, folding in the corner flaps of both sections, then folding down the other set of opposite flaps of the top section upon the corner flaps, and gluing and folding up the remaining flaps of the bottom section upon the second set of opposite folded flaps of the top section.

4. The method of wrapping plywood panels or the like in sectional cartons wherein each carton section is provided with side, end and corner flaps, comprising placing a stack of panels on one carton section, placing the other carton section on top of the panels, folding down the side flaps of the top section, gluing and folding up the side flaps of the bottom section upon the folded side flaps of the top section, folding in the corner flaps of both sections, then folding down the end flaps of the top section upon the corner flaps, and finally gluing and folding up the end flaps of the bottom section upon the folded end flaps of the top section.

5. The method of wrapping plywood panels or the like in sectional cartons wherein each carton section is provided with side and end flaps, comprising placing a stack of panels on one carton section, placing the other carton section on top of the panels, folding one set of opposite flaps of one section, gluing and folding the corresponding opposite flaps of the other section upon the first set of folded flaps, applying pressure to the top section to compress the panels between the carton sections before the glue has set, applying pressure to the folded and glued flaps to permit the glue to set, then folding the other set of opposite flaps of the first section, gluing and folding the remaining flaps of the second section upon the second set of folded flaps of the first section, and applying pressure to said last mentioned folded flaps to permit the glue to set.

6. The method of wrapping plywood panels or the like in sectional cartons wherein each carton section is provided with side and end flaps, comprising placing a stack of panels on one carton section, placing the other carton section on top of the panels, folding down the side flaps of the top section, gluing and folding up the side flaps of the bottom section upon the folded side flaps of the top section, applying pressure to the top section to compress the panels between the carton sections before the glue has set, applying pressure to the folded and glued side flaps to permit the glue to set, then folding down the end flaps of the top section, gluing and folding up the end flaps of the bottom section upon the folded end flaps of the top section, and finally applying pressure to the folded and glued end flaps to permit the glue to set.

7. The method of wrapping plywood panels or the like in sectional cartons wherein each carton section is provided with side, end and corner flaps, comprising placing a stack of panels on one carton section, placing the other carton section on top of the panels, folding down the side flaps of the top section, gluing and folding up the side flaps of the bottom section upon the folded side flaps of the top section, applying pressure to the top section to compress the panels between the carton sections before the glue has set, applying pressure to the folded and glued side flaps to permit the glue to set, folding in the corner flaps of both sections against the stack and maintaining said corner flaps in such folded position while folding down the end flaps of the top section upon the corner flaps, gluing and folding up the end flaps of the bottom section upon the folded end flaps of the top section, and applying pressure to the folded and glued end flaps to permit the glue to set.

8. The method of wrapping plywood panels or the like in sectional cartons wherein each carton section is provided with side and end flaps, comprising placing a stack of panels on one carton section, placing the other carton section on top of the panels, moving the assembled stack in a substantially straight path while folding one set of opposite flaps of one section gluing and folding the corresponding opposite flaps of the other carton section upon the first set of folded flaps while the stack is still moving in its straight path, then moving the stack in a path transverse to the first path while folding the other set of opposite flaps of the first section, and gluing and folding the remaining flaps of the second section upon the second set of flaps of the first section while the stack is still moving in its transverse path.

9. The method of wrapping plywood panels or the like in sectional cartons wherein each carton section is provided with side and end flaps, comprising placing a stack of panels on one carton section, placing the other carton section on top of the panels, moving the assembled stack in a substantially straight path while folding down the side flaps of the top section, gluing and folding up the side flaps of the bottom section upon the folded side flaps of the top section, applying pressure to the top section to compress the panels between the carton sections before the glue has set, applying pressure to the folded and glued side flaps to permit the glue to set while the stack is still moving in its straight path, then moving the stack in a path transverse to the first path while folding down the end flaps of the top section, gluing and folding up the end flaps of the bottom section upon the folded end flaps of the top section, and applying pressure to the folded and glued end flaps while the stack is still moving in its transverse path to permit the glue to set.

10. The method of wrapping plywood panels or the like in sectional cartons wherein each carton section is provided with side, end and corner flaps, comprising placing a stack of panels on one carton section, placing the other carton section on top of the panels, moving the assembled stack in a substantially straight path while folding down the side flaps of the top section, gluing and folding up the side flaps of the bottom section upon the folded side flaps of the top section, applying pressure to the top section to compress the panels between the carton sections before the glue has set, applying pressure to the folded and glued side flaps while the stack is still moving in its straight path to permit the glue to set, then moving the stack in a path transverse to the first path while folding in the corner flaps of both sections against the stack, folding down the end flaps of the top section upon the corner flaps, gluing and folding up the end flaps of the bottom section upon the folded end flaps of the top section, and applying pressure to the folded and glued end flaps while the stack is still moving in its transverse path to permit the glue to set.

11. In a machine for wrapping plywood panels or the like in sectional cartons wherein each section is provided with side and end flaps and a plurality of stacked panels are adapted to be assembled between a pair of carton sections, means for receiving each assembled stack and folding in one set of opposite flaps of one section, means for gluing and folding in the corresponding opposite flaps of the other section upon the first set of folded flaps, means for folding the other set of opposite flaps of the first section, and means for gluing and folding the remaining flaps of the second section upon the second set of folded flaps of the first section.

12. In a machine for wrapping plywood panels or the like in sectional cartons wherein each section is provided with side and end flaps and a plurality of stacked panels are adapted to be assembled between a pair of carton sections, means for receiving each assembled stack and folding down the side flaps of the top section, means for gluing and folding up the side flaps of the bottom section upon the folded side flaps of the top section, means for folding down the end flaps of the top section, and means for gluing and folding up the end flaps of the bottom section upon the folded end flaps of the top section.

13. In a machine for wrapping plywood panels or the like in sectional cartons wherein each section is provided with side, end and corner flaps and a plurality of stacked panels are adapted to be assembled between a pair of carton sections, means for receiving each assembled stack and folding in one set of opposite flaps of one section, means for gluing and folding in the corresponding opposite flaps of the other section upon the first set of folded flaps, means for folding in the corner flaps of both sections, means for folding in the other set of opposite flaps of the first section upon the corner flaps, and means for gluing and folding in the remaining flaps of the second section upon the second set of folded flaps of the first section.

14. In a machine for wrapping plywood panels or the like in sectional cartons wherein each section is provided with side and end flaps and a plurality of stacked panels are adapted to be assembled between a pair of carton sections, means for folding down the side flaps of the top section, means for gluing and folding up the side flaps of the bottom section upon the folded side flaps of the top section, means for applying pressure to the top section to compress the panels between the carton sections before the glue has set, means for applying pressure to the folded and glued side flaps to permit the glue to set, means for folding down the end flaps of the top section, means for gluing and folding up the end flaps of the bottom section upon the folded end flaps of the top section, and means for applying pressure to the folded and glued end flaps to permit the glue to set.

15. In a machine for wrapping plywood panels or the like in sectional cartons wherein each section is provided with side, end and corner flaps and a plurality of stacked panels are adapted to be assembled between a pair of carton sections, means for receiving each assembled stack and folding down the side flaps of the top section, means for gluing and folding up the side flaps of the bottom section upon the folded side flaps of the top section, means for applying pressure to the top section to compress the panels between the carton sections before the glue has set, means for applying pressure to the folded and glued side flaps to permit the glue to set, means for folding in the corner flaps of both sections against the stack and maintaining said corner flaps in such folded position while the end flaps of the top section are folded down, means for folding down the end flaps of the top section upon the corner flaps, means for gluing and folding up the end flaps of the bottom section upon the folded end flaps of the top section, and means for applying pressure to the folded and glued end flaps to permit the glue to set.

16. In a machine for wrapping plywood panels or the like in sectional cartons wherein each section is provided with side and end flaps and a plurality of stacked panels are adapted to be assembled between a pair of carton sections, means for receiving each assembled stack and moving it in a substantially straight path, means for folding one set of opposite flaps of one section during the travel of the stack, means for gluing and folding the corresponding opposite flaps of the other carton section upon the first set of folded flaps while the stack is still moving in its straight path, means for moving the partially wrapped stack in a direction substantially transverse to its first path, means for folding the other set of opposite flaps of the first section during said transverse movement, and means for gluing and folding the remaining flaps of the second section upon the second set of flaps of the first section while the stack is still moving in its transverse path.

17. In a machine for wrapping plywood panels or the like in sectional cartons wherein each section is provided with side and end flaps and a plurality of stacked panels are adapted to be assembled between a pair of carton sections, means for receiving each assembled stack and moving it in a substantially straight path, means for folding down the side flaps of the top section during the travel of the stack, means for gluing and folding up the side flaps of the bottom section upon the folded side flaps of the top section while the partially wrapped stack is still moving in a straight path, means for moving the stack in a path transverse to the first path, means for folding down the end flaps of the top section during said transverse movement, and means for gluing and folding up the end flaps of the bottom section upon the folded end flaps of the top section while the stack is still moving in a transverse path.

18. In a machine for wrapping plywood panels or the like in sectional cartons wherein each section is provided with side and end flaps and a plurality of stacked panels are adapted to be assembled between a pair of carton sections, means for receiving each assembled stack and moving it in a substantially straight path, means for folding down the side flaps of the top section during the travel of the stack, means for gluing and folding up the side flaps of the bottom section upon the folded side flaps of the top section, means for applying pressure to the top section to compress the panels between the carton sections before the glue has set, means for applying pressure to the folded and glued side flaps to permit the glue to set while the stack is still moving in its straight path, means for moving the partially wrapped stack in a direction substantially transverse to its first path, means for folding down the end flaps of the top section during said transverse movement, means for gluing and folding up the end flaps of the bottom section upon the folded end flaps of the top section, and means for applying pressure to the folded and glued end flaps while the stack is still moving in its transverse path to permit the glue to set.

19. In a machine for wrapping plywood panels or the like in sectional cartons wherein each section is provided with side, end and corner flaps and a plurality of stacked panels are adapted to be assembled between a pair of carton sections, means for receiving each assembled stack and moving it in a substantially straight path, means for folding down the side flaps of the top section during the travel of said stack, means for gluing and folding up the side flaps of the bottom section upon the folded side flaps of the top section, means for applying pressure to the top section to compress the panels between the carton sections before the glue has set, means for applying pressure to the folded and glued side flaps while the stack is still moving in its straight path to permit the glue to set, means for moving the partially wrapped stack in a path transverse to the first path, means for folding in the corner flaps of both sections against the stack during such movement, means for folding down the end flaps of the top section upon the corner flaps, means for gluing and folding up the end flaps of the bottom section upon the folded end flaps of the top section, and means for applying pressure to the folded and glued end flaps while the stack is still moving in its transverse path to permit the glue to set.

20. In a machine for wrapping plywood panels or the like in sectional cartons wherein each section is provided with side and end flaps and a plurality of stacked panels are adapted to be assembled between a pair of carton sections, a conveyor unit for receiving each assembled stack and feeding it in a substantially straight path, means associated with said conveyor unit for folding and gluing the side flaps of the carton sections during the movement of the stack through said unit, a second conveyor unit arranged substantially transversely to said first unit, means associated with said second conveyor unit for folding and gluing the end flaps of the carton sections during the movement of the partially wrapped stack through said second unit, and a transfer unit for receiving each stack from the first conveyor unit and shifting it laterally to the second conveyor unit.

21. In a machine for wrapping plywood panels or the like in sectional cartons wherein each section is provided with side and end flaps and a plurality of stacked panels are adapted to be assembled between a pair of carton sections, a conveyor unit for receiving each assembled stack and feeding it in a substantially straight path, means associated with said conveyor unit for folding and gluing the side flaps of the carton sections during the movement of the stack through said unit, a second conveyor unit arranged substantially transversely to said first unit, means associated with said second conveyor unit for folding and gluing the end flaps of the carton sections during the movement of the partially wrapped stack through said second unit, a transfer unit for receiving each stack from the first conveyor unit and shifting it laterally to the second conveyor unit, and means adapted to be actuated by said stacks for controlling the movement of and for effecting a uniform spacing of the stacks during their travel through said units.

22. In a machine for wrapping plywood panels or the like in sectional cartons wherein each section is provided with side and end flaps and a plurality of stacked panels are adapted to be assembled between a pair of carton sections, a conveyor unit for receiving each assembled stack and feeding it in a substantially straight path, means associated with said conveyor unit for folding and gluing the side flaps of the carton sections during the movement of the stack through said unit, a second conveyor unit arranged substantially transversely to said first unit, means associated with said second conveyor unit for folding and gluing the end flaps of the carton sections during the movement of the partially wrapped stack through said second unit, a transfer unit for receiving each stack from the first conveyor unit and shifting it laterally to the second conveyor unit, and means carried by said transfer unit in the path of and adapted to be actuated by the advancing stacks for placing the transfer unit in operation to transfer the stacks to the second conveyor unit.

23. In a machine for wrapping plywood panels or the like in sectional cartons wherein each section is provided with side, end and corner flaps and a plurality of stacked panels are adapted to be assembled between a pair of carton sections, a conveyor unit for receiving each assembled stack and feeding it in a substantially straight path, means associated with said conveyor unit for folding and gluing the side flaps of the carton sections during the movement of the stack through said unit, a second conveyor unit arranged substantially transversely to said first unit, means associated with said second conveyor for folding in the corner flaps of both sections, means also associated with said second conveyor unit for folding and gluing the end flaps of the carton sections, a transfer unit for receiving each partially wrapped stack from the first conveyor unit and shifting it laterally to the second conveyor unit, and means carried by said first conveyor unit in the path of the advancing stacks for initially folding in the forward set of corner flaps of both carton sections of each stack prior to its movement upon the transfer unit.

24. In a machine for wrapping plywood panels or the like in sectional cartons wherein each section is provided with side, end and corner flaps and a plurality of stacked panels are adapted to be assembled between a pair of carton sections, a conveyor unit for receiving each assembled stack and feeding it in a substantially straight path, means associated with said conveyor unit for folding and gluing the side flaps of the carton sections during the movement of the stack through said unit, a second conveyor unit arranged substantially transversely to said first unit, means associated with said second conveyor for folding in the corner flaps of both sections, means also associated with said second conveyor unit for folding and gluing the end flaps of the carton sections, a transfer unit for receiving each partially wrapped stack from the first conveyor unit and shifting it laterally to the second conveyor unit, means carried by said transfer unit in the path of and adapted to be actuated by the advancing stacks for placing the transfer unit in operation to transfer the stacks to the second conveyor unit, and means carried by said first conveyor unit in the path of the advancing stacks for initially folding in the forward set of corner flaps of both carton sections of each stack prior to its engagement with said last mentioned means.

25. In a machine for wrapping plywood panels or the like in sectional cartons wherein each section is provided with side and end flaps and a plurality of stacked panels are adapted to be assembled between a pair of carton sections, an assembly table comprising a side board carried by said table and having its lower edge positioned above the top surface of the table, a plurality of side plates supported by the table and connnected to the side board, each side plate having an inwardly opening side flap receiving slot, the lower wall of which is substantially in the plane of the surface of the table, and an end plate carried by the table and having an end flap receiving slot, the lower wall of which is substantially in the plane of the surface of the table, said side and end plates cooperating to position a carton section on the table whereby a stack of panels may be correctly placed on the section to permit subsequent folding of the flaps.

26. In a machine for wrapping plywood panels or the like in sectional cartons wherein each section is provided with side and end flaps and a plurality of stacked panels are adapted to be assembled between a pair of carton sections, an assembly table comprising a side board carried by said table and having its lower edge positioned above the top surface of the table, a plurality of side plates supported by the table and connected to the side board, said side plates having inwardly opening side flap receiving slots, and an end plate carried by the table and having an end flap receiving slot cooperating with the other slots to position a carton section on the table whereby a stack of panels may be correctly placed on the carton section to permit subsequent folding of the flaps.

27. In a machine for wrapping plywood panels or the like in sectional cartons wherein each section is provided with side and end flaps and a plurality of stacked panels are adapted to be assembled between a pair of carton sections, a conveyor unit including upper and lower conveyor belts for receiving each assembled stack and feeding it in a substantially straight path, a pair of members positioned on opposite sides of the lower belt for supporting the side flaps of each lower carton section, a pair of flap folding members positioned above the first mentioned members and adapted to engage and fold down the side flaps of each top carton section, a pair of glue applying units positioned over the first mentioned members for applying glue to the inner surfaces of the side flaps of each lower section, and a pair of lower side flap folding members positioned beyond the glue applying units and adapted to fold up the glued side flaps of each lower carton section upon the folded side flaps of its respective top carton section while the stack is being fed through the conveyor unit.

28. In a machine for wrapping plywood panels or the like in sectional cartons wherein each section is provided with side and end flaps and a plurality of stacked panels are adapted to be assembled between a pair of carton sections, a conveyor unit including upper and lower conveyor belts for receiving each assembled stack and feeding it in a substantially straight path, a pair of members positioned on opposite sides of the lower belt for supporting the side flaps of each lower carton section, a flap gluing unit including a fountain fed roller movably mounted above the lower side flap supporting member, and means associated with said roller and adapted to depress the same into engagement with the side flap of a lower carton section as it is fed over the supporting member, said means including an element positioned in the path of and adapted to be depressed by the assembled stacks as they are fed through the conveyor unit.

29. In a machine for wrapping plywood panels or the like in sectional cartons wherein each section is provided with side and end flaps and a plurality of stacked panels are adapted to be assembled between a pair of carton sections, a conveyor unit including upper and lower conveyor belts for receiving each assembled stack and feeding it in a substantially straight path, a pair of members positioned on opposite sides of the lower belt for supporting the side flaps of each lower carton section, a pair of flap gluing units positioned on opposite sides of the belts and each comprising a pivoted frame, a fountain fed roller mounted in said frame and normally positioned above the lower side flap supporting member, a pivoted arm operatively connected to said frame and located in the path of and adapted to be depressed by the assembled stacks as they are fed through the conveyor unit, and means connecting the pivoted arm to the roller whereby the depression of the pivoted arm will transmit downward movement to the roller to press the same into engagement with the side flaps of the lower carton sections as they are fed through the conveyor unit.

30. In a machine for wrapping plywood panels or the like in sectional cartons wherein each section is provided with side and end flaps and a plurality of stacked panels are adapted to be assembled between a pair of carton sections, a conveyor unit for feeding the assembled stack while the side flaps of both carton sections are being folded against the stack and glued, a second conveyor unit adjoining the first unit for receiving and advancing the stack in the machine, and means carried by the machine on opposite sides of the second conveyor unit for applying pressure upon the top carton section to compress the assembled stack before the glue has set on the side flaps.

31. In a machine for wrapping plywood panels or the like in sectional cartons wherein each section is provided with side and end flaps and a plurality of stacked panels are adapted to be assembled between a pair of carton sections, a conveyor unit for feeding the assembled stack while the side flaps of both carton sections are being folded against the stack and glued, a second conveyor unit adjoining the first unit for receiving and advancing the stack in the machine, and means for engaging the longitudinal edges of the top carton section for applying pressure thereto to compress the assembled stack before the glue has set on the side flaps, said means including a pair of spaced brackets positioned on opposite sides of the second conveyor unit and mounted in the machine for vertical movement, and a plurality of weighted rollers supported on each bracket and adapted to be raised with the bracket by the partially wrapped stacks as they are fed through the second conveyor.

32. In a machine for wrapping plywood panels or the like in sectional cartons wherein each section is provided with side and end flaps and a plurality of stacked panels are adapted to be assembled between a pair of carton sections, a conveyor unit for feeding the assembled stack while the side flaps of both carton sections are being folded against the stack and glued, means for applying pressure upon the top carton section to compress the stack before the glue has set, a second conveyor unit for receiving the partially wrapped stack, said unit including a top endless conveyor belt, and a weighted pressure roller carried by and positioned transversely of the machine and adapted to engage substantially the entire surface of the top carton section to apply additional downward pressure upon the stack as it is conveyed under the pressure roller, said top endless conveyor belt passing around said pressure roller and imparting rotary movement thereto.

33. In a machine for wrapping plywood panels or the like in sectional cartons wherein each section is provided with side and end flaps and a plurality of stacked panels are adapted to be assembled between a pair of carton sections, a conveyor unit for feeding the assembled stack, means for folding and gluing the side flaps of both carton sections while the assembled stack is being fed through the conveyor unit, a second conveyor unit adjoining the first unit, means for applying pressure to the top carton section while the stack is passing through the second conveyor unit, a third conveyor unit adjoining the second unit, and means associated with said third unit for applying sealing pressure to each of the folded and glued side flaps.

34. In a machine for wrapping plywood panels or the like in sectional cartons wherein each section is provided with side and end flaps and a plurality of stacked panels are adapted to be assembled between a pair of carton sections, a motor operated conveyor unit for receiving each assembled stack and feeding it in a substantially straight path, means associated with said conveyor unit for folding and gluing the side flaps of the carton sections during the movement of the stack through said unit, a second motor operated conveyor unit arranged substantially transversely to said first unit, means associated with said second conveyor unit for folding and gluing the end flaps of the carton sections during the movement of the partially wrapped stack through said second unit, a motor operated transfer unit for receiving each stack from the first conveyor unit and shifting it laterally to the second conveyor unit, the circuit to the conveyor units being normally closed and the circuit to the transfer unit being normally open, and a stack operated switch carried by the transfer unit in the path of the advancing stacks and connected in the circuits of the conveyor motors whereby operation of the switch by a partially wrapped stack as it enters the transfer unit will render the transfer motor operative and the first conveyor motor inoperative.

35. In a machine for wrapping plywood panels and the like in sectional cartons wherein each section is provided with side, end and corner flaps, and a plurality of stacked panels are adapted to be assembled between a pair of carton sections, an adjustable conveyor unit for receiving each assembled stack and feeding it in a substantially straight path, means associated with said conveyor unit for folding and gluing the side flaps of the carton sections during movement of the stack through said unit, a second conveyor unit arranged substantially transversely to said first unit, means associated with said second conveyor unit for folding and gluing the end flaps of the carton section during movement of the partially wrapped stacks through the second unit, a motor operated corner tucker carried by said second unit, a stack operated switch movably mounted on the second unit in the path of the advancing stacks and controlling the tucker motor, and means associated with said switch and the first conveyor unit for moving said switch with respect to said corner tucker when the first unit is adjusted to accommodate panels of different sizes.

36. Those steps in the method of wrapping plywood panels or the like, comprising placing a plurality of panels between a pair of identical carton sections of greater area than the panels, moving the assembled stack in a predetermined path while folding certain of the edges of one carton section, and then gluing and folding certain of the edges of the other section upon the folded edges of the first section while the stack is still being moved.

37. Those steps in the method of wrapping plywood panels or the like, comprising placing a plurality of panels between a pair of carton sections of greater area than the panels, folding opposite sides of one section, gluing and folding the corresponding opposite sides of the other section upon the folded sides of the first section, applying pressure to the top section to compress the panels between the carton sections before the glue has set, and then applying pressure to the folded and glued sides to permit the glue to set.

38. The method of wrapping plywood panels or the like, comprising placing a plurality of panels between a pair of carton sections of greater area than the panels, moving the assembled stack in a substantially straight path while folding opposite sides of one section, folding the corresponding opposite sides of the other section upon the folded sides of the first section and securing said folded sides together while the stack is still moving in its straight path, then moving the stack in a path transverse to the first path while folding the remaining opposite sides of the first section, and folding the remaining opposite sides of the second section upon the second set of folded sides of the first section and securing said second set of folded sides together while the stack is still moving in its transverse path.

39. In a machine for wrapping plywood panels or the like in sectional cartons wherein a plurality of stacked panels are adapted to be assembled between a pair of carton sections of greater area than the panels, means for receiving said assembled stack and folding and securing together certain of the edges of said carton sections, and means for folding and securing together the remainder of the edges of said carton sections to complete the wrapping operation.

40. In a machine for wrapping plywood panels or the like in sectional cartons wherein a plurality of stacked panels are adapted to be assembled between a pair of carton sections of greater area than the panels, means for receiving said assembled stack and moving it in one direction while securing together one set of opposite sides of said carton sections, and means for receiving the partially wrapped stack and moving it in a different direction while securing together the remainder of the opposite sides of said carton sections to complete the wrapping operation.

41. In a machine for wrapping plywood panels or the like in sectional cartons wherein a plurality of stacked panels are adapted to be assembled between a pair of carton sections of greater area than the panels, means for receiving each assembled stack and folding opposite sides of one section, means for folding the corresponding opposite sides of the other section upon the folded sides of the first section and securing said folded sides together, means for folding the remaining opposite sides of the first section, and means for folding the remaining opposite sides of the second section upon the second set of folded sides of the first section and securing said second set of folded sides together.

42. In a machine for wrapping plywood panels or the like in sectional cartons wherein a plurality of stacked panels are adapted to be assembled between a pair of carton sections of greater area than the panels, means for receiving each assembled stack and moving it in a substantially straight path, means for folding opposite sides of one section, means for folding the corresponding opposite sides of the other section upon the folded sides of the first section and securing said folded sides together, means for moving the partially wrapped stack in a direction substantially transverse to its first path, means for folding the remaining opposite sides of the first section during said transverse movement, and means for folding the remaining opposite sides of the second section upon the second set of folded sides of the first section and securing said second set of folded sides together while the stack is still moving in its transverse path.

43. In a machine for wrapping plywood panels or the like in sectional cartons wherein a plurality of stacked panels are adapted to be assembled between a pair of carton sections of greater area than the panels, a conveyor unit for receiving each assembled stack and feeding it in a substantially straight path, means associated with said conveyor unit for securing together certain of the sides of said carton sections during the movement of the stack through said unit, a second conveyor unit arranged substantially transversely to said first unit and adapted to receive the partially wrapped stack from said first unit, and means associated with said second unit for securing together the remainder of the sides of said carton sections during the movement of the partially wrapped stack through said second unit.

44. In a machine for wrapping plywood panels or the like in sectional cartons wherein a plurality of stacked panels are adapted to be assembled between a pair of carton sections of greater area than the panels, a conveyor unit for receiving each assembled stack and feeding it in a substantially straight path, means associated with said conveyor unit for securing together certain of the sides of said carton sections during the movement of the stack through said unit, a second conveyor unit arranged substantially transversely to said first unit and adapted to receive the partially wrapped stack from said first unit, means associated with said second unit for securing together the remainder of the sides of said carton sections during the movement of the partially wrapped stack through said second unit, a transfer unit for receiving each stack from the first conveyor unit and shifting it to the second conveyor unit, and means adapted to be actuated by the stacks for controlling the movement of and for effecting a uniform spacing of the stacks during their travel through said units.

45. In a machine for wrapping plywood panels or the like in sectional cartons wherein a plurality of stacked panels are adapted to be assembled between a pair of carton sections of greater area than the panels, a conveyor unit for receiving each assembled stack and feeding it in a substantially straight path, means associated with said conveyor unit for securing together certain of the sides of said carton sections during the movement of the stack through said unit, a second conveyor unit arranged substantially transversely to said first unit and adapted to receive the partially wrapped stack from said first unit, means associated with said second unit for securing together the remainder of the sides of said carton sections during the movement of the partially wrapped stack through said second unit, a transfer unit for receiving each stack from the first conveyor unit and transferring it to the second conveyor unit, and means carried by said transfer unit in the path of and adapted to be actuated by the advancing stacks for placing the transfer unit in operation to transfer the stacks to the second conveyor unit.

46. In a machine for wrapping plywood panels or the like in sectional cartons wherein each section is provided with side, end and corner flaps, and a plurality of stacked panels are adapted to be assembled between a pair of carton sections, an adjustable conveyor unit for receiving each assembled stack and feeding it in a substantially straight path, means associated with said conveyor unit for folding and gluing the side flaps of the carton sections during movement of the stack through said unit, a second conveyor unit arranged substantially transversely to said first unit, means associated with said second conveyor unit for folding and gluing the end flaps of the carton section during movement of the partially wrapped stacks through the second unit, a motor operated corner tucker located in advance of said end flap folding and gluing means, and a stack operated tucker controlling switch mounted on the second unit in rear of said tucker.

47. In a machine for wrapping plywood panels or the like in sectional cartons wherein each section is provided with side, end and corner flaps, and a plurality of stacked panels are adapted to be assembled between a pair of carton sections, an adjustable conveyor unit for receiving each assembled stack and feeding it in a substantially straight path, means associated with said conveyor unit for folding and gluing the side flaps of the carton sections during movement of the stack through said unit, a second conveyor unit arranged substantially transversely to said first unit, means associated with said second conveyor unit for folding and gluing the end flaps of the carton section during movement of the partially wrapped stacks through the second unit, a motor operated corner tucker carried by said second unit, a stack operated switch movably mounted on the second unit in the path of the advancing stacks and controlling the tucker motor, and a flexible cable having one end connected to said switch and the other end connected to said first conveyor unit for moving said switch relative to said tucker when said first conveyor unit is adjusted to accommodate panels of different sizes.

48. In a machine for wrapping plywood panels or the like in sectional cartons wherein each section is provided with side, end and corner flaps, and a plurality of stacked panels are adapted to be assembled between a pair of carton sections, an adjustable conveyor unit for receiving each assembled stack and feeding it in a substantially straight path, means associated with said conveyor unit for folding and gluing the side flaps of the carton sections during movement of the stack through said unit, a second conveyor unit arranged substantially transversely to said first unit, means associated with said second conveyor unit for folding and gluing the end flaps of the carton section during movement of the partially wrapped stacks through the second unit, a motor operated corner tucker carried by said second unit, a stack operated tucker controlling switch slidably mounted on said second unit in the path of the advancing stacks, a weighted element suspended from said switch and tending to move it away from said tucker, and a flexible cable having one end connected to said switch and the other end connected to said first conveyor unit for moving said switch relative to said tucker when said first conveyor unit is adjusted to accommodate panels of different sizes.

49. In a machine for wrapping plywood panels or the like in sectional cartons wherein each section is provided with side and end flaps and a plurality of stacked panels are adapted to be assembled between a pair of carton sections, a conveyor unit for feeding the assembled stack while the side flaps of both carton sections are being folded against the stack and glued, a second conveyor unit adjoining the first unit for receiving and advancing the stack in the machine, and means including spaced sets of weighted rollers mounted in the machine above and on opposite sides of the second conveyor unit, each set of rollers being adapted to engage the longitudinal edges of the top carton section and to apply downward pressure upon the same to compress the assembled stack before the glue has set on the side flaps.

50. In a machine for wrapping plywood panels or the like in sectional cartons wherein each section is provided with side and end flaps and a plurality of stacked panels are adapted to be assembled between a pair of carton sections, a conveyor unit for feeding the assembled stack while the side flaps of both carton sections are being folded against the stack and glued, a second conveyor unit adjoining the first unit for receiving and advancing the stack in the machine, means carried by the machine on opposite sides of the second conveyor unit for applying pressure upon the longitudinal edges of the top carton section to compress the assembled stack before the glue has set on the side flaps, and means carried by the machine above and in substantial alignment with said second conveyor unit for applying pressure centrally of the top carton section and to assist the second conveyor in feeding the partially wrapped stack against the pressing action of the first mentioned means.

51. In a machine for wrapping plywood panels or the like in sectional cartons wherein each section is provided with side and end flaps and a plurality of stacked panels are adapted to be assembled between a pair of carton sections, a conveyor unit for feeding the assembled stack while the side flaps of both carton sections are being folded against the stack and glued, a second conveyor unit adjoining the first unit for receiving and advancing the stack in the machine, means including spaced sets of weighted rollers mounted on the machine above and on opposite sides of the second conveyor unit, each set of rollers being adapted to engage the longitudinal edges of the top carton section and to apply downward pressure upon the same to compress the assembled stack before the glue has set on the side flaps, and a weighted pressure roller mounted on and extending transversely of the machine, said last mentioned roller positioned beyond the spaced sets of rollers and adapted to contact substantially the entire surface of the top carton section and apply additional final downward pressure upon the stack.

52. In a machine for wrapping plywood panels or the like in sectional cartons wherein a plurality of stacked panels are adapted to be assembled between a pair of carton sections of greater area than the panels, conveyor mechanism for transporting the assembled stack, and means associated with said conveyor mechanism for folding in the edges of the carton sections against the stack in overlapping relation and securing said edges together during the travel of said stack on said conveyor mechanism.

53. The method of wrapping plywood panels or the like in sectional cartons wherein each carton section is provided with side and end flaps, comprising placing a stack of panels on one carton section, placing the other carton section on top of the panels, folding one set of opposite flaps of one section, folding and securing the corresponding opposite flaps of the other section upon the first set of folded flaps, then folding the other set of opposite flaps of the first section, and folding and securing the remaining flaps of the second section upon the second set of folded flaps of the first section.

RAY C. DEMLER.